(12) United States Patent
Lv et al.

(10) Patent No.: US 12,003,850 B2
(45) Date of Patent: Jun. 4, 2024

(54) METHOD FOR SELECTING IMAGE BASED ON BURST SHOOTING AND ELECTRONIC DEVICE

(71) Applicant: Huawei Technologies Co., Ltd., Shenzhen (CN)

(72) Inventors: Shuailin Lv, Beijing (CN); Yunchao Zhang, Beijing (CN); Hongyu Li, Beijing (CN); Zhiping Jia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 17/427,433

(22) PCT Filed: Jan. 31, 2019

(86) PCT No.: PCT/CN2019/074266
§ 371 (c)(1),
(2) Date: Jul. 30, 2021

(87) PCT Pub. No.: WO2020/155052
PCT Pub. Date: Aug. 6, 2020

(65) Prior Publication Data
US 2022/0094846 A1    Mar. 24, 2022

(51) Int. Cl.
*H04N 23/60* (2023.01)
*G06T 7/00* (2017.01)
*H04N 5/77* (2006.01)

(52) U.S. Cl.
CPC .......... *H04N 23/64* (2023.01); *G06T 7/0002* (2013.01); *H04N 5/772* (2013.01)

(58) Field of Classification Search
CPC ........ H04N 23/64; H04N 5/772; H04N 23/62; H04N 23/63; H04N 23/631; H04N 23/743; H04N 23/80; H04N 23/611; G06T 7/0002
See application file for complete search history.

(56) References Cited

U.S. PATENT DOCUMENTS 10,027,922 B2   7/2018  Matsuda et al.
10,489,898 B2  11/2019  Nakada
(Continued)

FOREIGN PATENT DOCUMENTS

CN   101222582 A   7/2008
CN   102209196 A  10/2011
(Continued)

*Primary Examiner* — Abdelaaziz Tissire
(74) *Attorney, Agent, or Firm* — Slater Matsil, LLP

(57) ABSTRACT

A method for selecting an image based on burst shooting is provided, which relates to the field of terminal technologies. The method includes: an electronic device displays a preview interface; detects a first operation used to start burst shooting; obtains N images; then performs scene recognition based on K images that meet an image quality screening condition, to determine a shooting scene; and finally determines M images based on the shooting scene, where N is greater than or equal to K, N is greater than or equal to M, N and K are positive integers greater than 1, and M is a positive integer greater than or equal to 1. This technical solution helps improve quality of an image obtained by the electronic device through screening, thereby improving user satisfaction with an image that is automatically obtained through screening during burst shooting by the electronic device.

16 Claims, 15 Drawing Sheets

(56) References Cited

U.S. PATENT DOCUMENTS

| | | | |
|---|---|---|---|
| 10,523,894 B2 | 12/2019 | Keating et al. | |
| 2006/0221223 A1* | 10/2006 | Terada | H04N 23/71 |
| | | | 348/333.05 |
| 2014/0184848 A1* | 7/2014 | Shimosato | H04N 23/632 |
| | | | 348/222.1 |
| 2014/0240537 A1* | 8/2014 | Nakada | H04N 1/00336 |
| | | | 348/231.2 |
| 2014/0334736 A1* | 11/2014 | Niu | G06V 40/171 |
| | | | 382/195 |
| 2014/0354845 A1* | 12/2014 | Molgaard | H04N 5/2625 |
| | | | 348/222.1 |
| 2015/0063636 A1* | 3/2015 | Jin | G06V 40/172 |
| | | | 382/103 |
| 2015/0071547 A1* | 3/2015 | Keating | G06F 18/24 |
| | | | 382/224 |
| 2017/0366697 A1 | 12/2017 | Shih et al. | |
| 2018/0005077 A1 | 1/2018 | Wang et al. | |

FOREIGN PATENT DOCUMENTS

| | | |
|---|---|---|
| CN | 103618855 A | 3/2014 |
| CN | 103797786 A | 5/2014 |
| CN | 104185981 A | 12/2014 |
| CN | 104683692 A | 6/2015 |
| CN | 105531988 A | 4/2016 |
| CN | 105654463 A | 6/2016 |
| CN | 105786350 A | 7/2016 |
| CN | 105991952 A | 10/2016 |
| CN | 107105150 A | 8/2017 |
| CN | 107659722 A | 2/2018 |
| EP | 3044947 A1 | 7/2016 |
| JP | 2011040860 A | 2/2011 |
| WO | 2015034725 A1 | 3/2015 |

\* cited by examiner

METHOD FOR SELECTING IMAGE BASED ON BURST SHOOTING AND ELECTRONIC DEVICE

CROSS-REFERENCE TO RELATED APPLICATIONS

This application is a national stage application of International Application No. PCT/CN2019/074266 filed on Jan. 31, 2019, which is incorporated herein by reference in its entirety.

TECHNICAL FIELD

This application relates to the field of terminal technologies, and in particular, to a method for selecting an image based on burst shooting and an electronic device.

BACKGROUND

Currently, a smartphone supports a burst shooting function, and can perform burst shooting in response to a user operation. The user operation may be an operation of touching and holding a shooting button, an operation of pressing and holding a volume down button, or the like.

Specifically, the smartphone performs burst shooting at a specific rate, for example, 10 frames per second. Generally, the smartphone stores all images that are automatically obtained at a specific rate within shooting duration. The shooting duration is duration in which a user touches and holds a shooting button or presses and holds a volume down button. However, because shooting statuses (for example, image definitions, expressions of photographed objects, and actions) of all images are different, the user needs to manually perform screening on stored images obtained through burst shooting. Consequently, user experience is relatively poor.

SUMMARY

An objective of this application is to provide a method for selecting an image based on burst shooting and an electronic device, to help improve image quality during burst shooting by the electronic device.

The foregoing objective and another objective may be achieved by using features in the independent claims. Further implementations are reflected in the dependent claims, this specification, and the accompanying drawings.

According to a first aspect, a method for selecting an image based on burst shooting is provided. The method is applied to an electronic device. The electronic device includes a camera and a display. The method includes:

The electronic device displays a preview interface on the display, where the preview interface is used to display an image captured by the camera; detects a first operation used to start burst shooting; in response to the first operation, obtains N images captured by the camera; then performs scene recognition based on K images that meet an image quality screening condition in the N images, to determine a shooting scene; and finally determines M images from the N images based on the shooting scene, where N is greater than or equal to K, N is greater than or equal to M, N and K are positive integers greater than 1, and M is a positive integer greater than or equal to 1.

In this embodiment of this application, the electronic device can perform, based on a shooting scene, screening on images obtained through burst shooting. Therefore, compared with the conventional technology in which an image is selected based only on a parameter used to evaluate image quality such as a definition or a contrast, this helps improve quality of an image obtained by the electronic device through screening, thereby improving user satisfaction with an image that is automatically obtained through screening during burst shooting by the electronic device.

In a possible design, the electronic device may determine the M images from the N images based on the shooting scene in the following manner:

The electronic device determines an image content screening condition based on the shooting scene, and determines the M images that meet the image content screening condition from the N images. This helps simplify an implementation and improve image selection efficiency.

In a possible design, the electronic device may further determine the M images that meet the image content screening condition from the N images in the following manner:

The electronic device determines the M images that meet the image content screening condition from Q images, where the Q images are all images that meet the image quality screening condition in the N images, M≤Q≤N, and Q is a positive integer. This helps further improve quality of the M images and improve image selection efficiency.

In a possible design, after determining the M images, the electronic device automatically stores the M images, and deletes an image in the N images other than the M images. This helps increase utilization of storage space of the electronic device.

In a possible design, after determining the M images, the electronic device displays the M images on the display; and in response to a second operation performed by a user on a first image in the M images, displays the first image on the display in full screen. This helps the user view or preview the M images determined by the electronic device.

In a possible design, after displaying the first image on the display in full screen, in response to a third operation performed by the user on the first image, the electronic device exits full-screen display of the first image, and displays the M images on the display. This facilitates a user operation, and improves interaction between the user and the electronic device.

In a possible design, after displaying the M images on the display, in response to an operation that the user selects at least one image from the M images, the electronic device may further store the at least one image. This facilitates a user operation.

In a possible design, the electronic device may perform scene recognition in the following manner:

The electronic device performs scene recognition based on preset scene recognition priority information and the K images that meet the image quality screening condition in the N images, to determine the shooting scene. This helps simplify an implementation and improve scene recognition efficiency.

In a possible design, the electronic device may further perform scene recognition in the following manner:

Each time the electronic device obtains an image captured by the camera, the electronic device determines whether the image captured by the camera meets the image quality screening condition; and if the image meets the image quality screening condition, the electronic device caches the image; or if the image does not meet the image quality screening condition, the electronic device deletes the image.

When the obtained $i^{th}$ image captured by the camera meets the image quality screening condition, the electronic device determines that there are K cached images that meet the image quality screening condition, and performs scene recognition based on the K cached images that meet the image quality screening condition, to determine a shooting scene, where i is a positive integer less than or equal to N. This helps further improve scene recognition efficiency, thereby improving efficiency of image selection by the electronic device.

In a possible design, the preset scene recognition priority information is used to indicate that a descending order of scene recognition priorities is: a jumping scene, a look-back scene, and another scene. This helps simplify an implementation.

In a possible design, the image quality screening condition includes one or more of an image definition screening condition, an image contrast screening condition, an image brightness screening condition, an image exposure screening condition, an image saturation screening condition, a condition indicating whether there is a color block in an image, or a condition indicating whether there is a color cast in an image. This helps improve quality of an image selected by the electronic device.

In a possible design, in response to a fourth operation, the electronic device enables a function of performing intelligent image screening based on burst shooting. This facilitates interaction between the user and the electronic device.

According to a second aspect, an embodiment of this application provides another method for selecting an image based on burst shooting. The method is applied to an electronic device. The electronic device includes a camera and a display. The method includes:

The electronic device displays a preview interface on the display, where the preview interface is used to display an image captured by the camera. When the electronic device detects a first operation used to start burst shooting, in response to the first operation, the electronic device obtains N first-resolution images captured by the camera; separately performs down-sampling on the N first-resolution images to obtain N second-resolution images; then performs scene recognition based on K second-resolution images that meet an image quality screening condition in the N second-resolution images, to determine a shooting scene; and finally determines M second-resolution images from the N second-resolution images based on the shooting scene, where the Q images are all images that meet the image quality screening condition in the N second-resolution images, N is greater than or equal to K, N is greater than or equal to M, N and K are positive integers greater than 1, and M is a positive integer greater than or equal to 1.

In this embodiment of this application, the electronic device can perform, based on a shooting scene, screening on images obtained through burst shooting. Therefore, compared with the prior art in which an image is selected based only on a parameter used to evaluate image quality such as a definition or a contrast, this helps improve quality of an image obtained by the electronic device through screening, thereby improving user satisfaction with an image that is automatically obtained through screening during burst shooting by the electronic device. In addition, in this embodiment of this application, before selecting an image, the electronic device performs down-sampling on the image. This helps improve efficiency of subsequent image processing and improve efficiency of image selection by the electronic device.

According to a third aspect, an embodiment of this application provides an electronic device. The electronic device includes a display, a camera, one or more processors, and a memory.

The memory stores one or more computer programs, the one or more computer programs include instructions, and when the instructions are executed by the electronic device, the electronic device is enabled to perform the following steps:

displaying a preview interface on the display, where the preview interface is used to display an image captured by the camera;

detecting a first operation used to start burst shooting;

in response to the first operation, obtaining N images captured by the camera;

performing scene recognition based on K images that meet an image quality screening condition in the N images, to determine a shooting scene; and determining M images from the N images based on the shooting scene, where N is greater than or equal to K, N is greater than or equal to M, N and K are positive integers greater than 1, and M is a positive integer greater than or equal to 1.

In a possible design, the M images may be determined from the N images based on the shooting scene in the following manner:

determining an image content screening condition based on the shooting scene; and determining the M images that meet the image content screening condition from the N images.

In a possible design, the M images that meet the image content screening condition may be determined in the following manner:

determining the M images that meet the image content screening condition from Q images, where the Q images are all images that meet the image quality screening condition in the N images, M≤Q≤N, and Q is a positive integer.

In a possible design, when the instructions are executed by the electronic device, after determining the M images, the electronic device is enabled to further perform the following steps:

automatically storing the M images, and deleting an image in the N images other than the M images.

In a possible design, when the instructions are executed by the electronic device, after determining the M images, the electronic device is enabled to further perform the following steps:

displaying the M images on the display; and in response to a second operation performed by a user on a first image in the M images, displaying the first image on the display in full screen.

In a possible design, when the instructions are executed by the electronic device, after displaying the first image on the display in full screen, the electronic device is enabled to further perform the following steps:

in response to a third operation performed by the user on the first image, exiting full-screen display of the first image, and displaying the M images on the display.

In a possible design, when the instructions are executed by the electronic device, after displaying the first image on the display in full screen, the electronic device is enabled to further perform the following step:

in response to an operation that the user selects at least one image from the M images, storing the at least one image.

In a possible design, scene recognition may be performed in the following manner:

performing scene recognition based on preset scene recognition priority information and the K images that meet the image quality screening condition in the N images, to determine the shooting scene.

In a possible design, scene recognition may be performed in the following manner:

each time the electronic device obtains an image captured by the camera, determining whether the image captured by the camera meets the image quality screening condition; and if the image meets the image quality screening condition, caching the image; or if the image does not meet the image quality screening condition, deleting the image; and when the obtained $i^{th}$ image captured by the camera meets the image quality screening condition, determining that there are K cached images that meet the image quality screening condition, and performing scene recognition based on the K cached images that meet the image quality screening condition, to determine a shooting scene, where i is a positive integer less than or equal to N.

In a possible design, the preset scene recognition priority information is used to indicate that a descending order of scene recognition priorities is: a jumping scene, a look-back scene, and another scene.

In a possible design, the image quality screening condition includes one or more of an image definition screening condition, an image contrast screening condition, an image brightness screening condition, an image exposure screening condition, an image saturation screening condition, a condition indicating whether there is a color block in an image, or a condition indicating whether there is a color cast in an image.

In a possible design, when the instructions are executed by the electronic device, the electronic device is enabled to further perform the following step: in response to a fourth operation, enabling a function of performing intelligent image screening based on burst shooting.

According to a fourth aspect, an embodiment of this application provides another electronic device, including a display, a camera, one or more processors, and a memory.

The memory stores one or more computer programs, the one or more computer programs include instructions, and when the instructions are executed by the electronic device, the electronic device is enabled to perform the following steps:

displaying a preview interface on the display, where the preview interface is used to display an image captured by the camera;

detecting a first operation used to start burst shooting;

in response to the first operation, obtaining N first-resolution images captured by the camera;

separately performing down-sampling on the N first-resolution images to obtain N second-resolution images;

performing scene recognition based on K second-resolution images that meet an image quality screening condition in the N second-resolution images, to determine a shooting scene; and determining M second-resolution images from the N second-resolution images based on the shooting scene, where the Q images are all images that meet the image quality screening condition in the N second-resolution images, N is greater than or equal to K, N is greater than or equal to M, N and K are positive integers greater than 1, and M is a positive integer greater than or equal to 1.

According to a fifth aspect, an embodiment of this application provides an apparatus. The apparatus is included in an electronic device, and the apparatus has functions of implementing behavior of the electronic device in the method according to any one of the foregoing aspects of the method parts. The functions may be implemented by hardware, or may be implemented by hardware executing corresponding software. The hardware or the software includes one or more modules or units corresponding to the foregoing functions.

According to a sixth aspect, an embodiment of this application provides a chip. The chip is coupled to a memory in an electronic device, to perform the method according to any one of the foregoing aspects.

According to a seventh aspect, an embodiment of this application provides a computer storage medium. The computer storage medium stores program instructions, and when the program instructions are run on an electronic device, the electronic device is enabled to perform the method according to any one of the foregoing aspects.

According to an eighth aspect, an embodiment of this application provides a computer program product. When the computer program product is run on an electronic device, the electronic device is enabled to perform the method according to any one of the foregoing aspects.

In addition, for technical effects brought by the third aspect to the eighth aspect, refer to the related descriptions in the foregoing method parts. Details are not described herein again.

It should be noted that "coupling" in embodiments of this application means a direct combination or an indirect combination between two components.

DETAILED DESCRIPTION OF ILLUSTRATIVE EMBODIMENTS

In the embodiments of this application, "at least one" means one or more, and "a plurality of" means two or more. The term "and/or" describes an association relationship between associated objects, and indicates that three relationships may exist. For example, A and/or B may represent the following three relationships: Only A exists, both A and B exist, and only B exists, where A and B may be singular or plural. The character "/" generally represents an "or" relationship between the associated objects, "at least one of the following" or a similar expression thereof indicates any combination of the following, and includes any combination of one or more of the following. For example, at least one of a, b, or c may indicate a, b, c, a and b, a and c, b and c, or a, b, and c, where a, b, and c may be singular or plural.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean a same embodiment, but mean "one or more but not all of the embodiments", unless otherwise specifically emphasized. The terms "include", "comprise", "have", and variants thereof all mean "include but are not limited to", unless otherwise specifically emphasized.

The following describes an electronic device, a graphical user interface (graphical user interface, GUI) used for such an electronic device, and embodiments for using such an electronic device. In some embodiments of this application, the electronic device may be a portable electronic device having a function such as a camera, for example, a mobile phone, a tablet computer, a wearable device having a wireless communication function (for example, a smartwatch), or a vehicle-mounted device. An example embodiment of the portable electronic device includes but is not limited to a portable electronic device using iOS®, Android®, Microsoft®, or another operating system. The portable electronic device may alternatively be a laptop (Laptop) or the like. It should be further understood that, in some other embodiments of this application, the electronic device may alternatively be a desktop computer.

Figure 1:
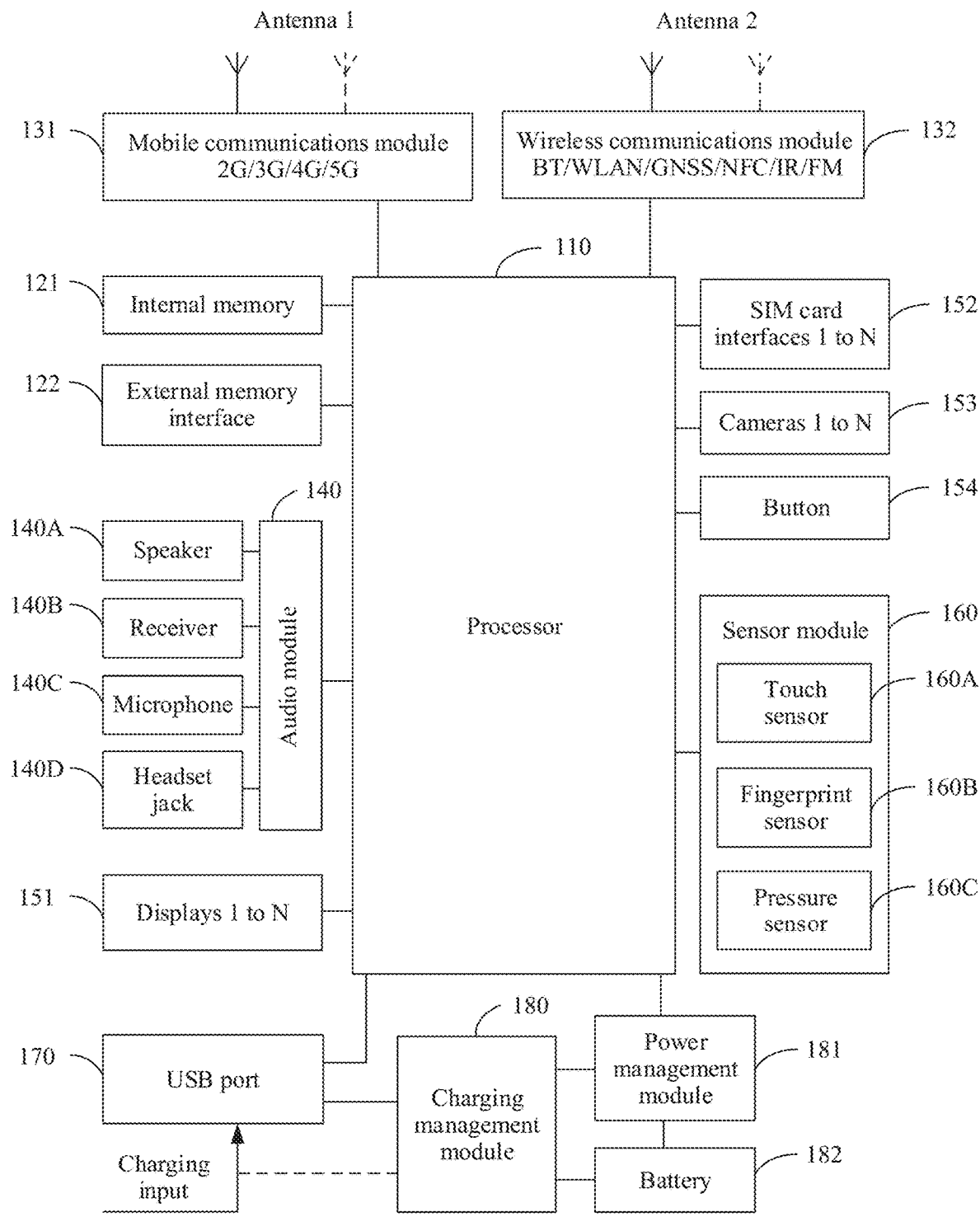
FIG. 1 is a schematic structural diagram of an electronic device according to an embodiment of this application.

For example, FIG. 1 is a schematic structural diagram of an electronic device according to an embodiment of this application. Specifically, as shown in the figure, the electronic device 100 includes a processor 110, an internal memory 121, an external memory interface 122, an antenna 1, a mobile communications module 131, an antenna 2, a wireless communications module 132, an audio module 140, a speaker 140A, a receiver 140B, a microphone 140C, a headset jack 140D, a display 151, a subscriber identity module (subscriber identification module, SIM) card interface 152, a camera 153, a button 154, a sensor module 160, a universal serial bus (universal serial bus, USB) port 170, a charging management module 180, a power management module 181, and a battery 182. In some other embodiments, the electronic device may further include a motor, an indicator, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural processing unit (neural-network processing unit, NPU). Different processing units may be independent components, or may be integrated into one or more processors.

In some embodiments, a memory may be further disposed in the processor 110, and is configured to store instructions and data. For example, the memory in the processor 110 may be a cache memory. The memory may be configured to store instructions or data that is just used or cyclically used by the processor 110. If the processor 110 needs to use the instructions or the data again, the processor 110 may directly invoke the instructions or the data from the memory. This helps avoid repeated access and reduce a waiting time of the processor 110, thereby improving system efficiency.

The internal memory 121 may be configured to store one or more computer programs. The one or more computer programs include instructions. The processor 110 may run the instructions stored in the internal memory 121, so that the electronic device 100 is enabled to perform methods for selecting an image based on burst shooting provided in some embodiments of this application, other function applications, data processing, and the like. The internal memory 121 may include a program storage area and a data storage area. The program storage area may store an operating system. The program storage area may further store one or more applications (for example, Gallery and Contacts), and the like. The data storage area may store data (for example, an image or a contact) or the like created during use of the electronic device 100. In addition, the internal memory 121 may include a high-speed random access memory, or may include a nonvolatile memory, for example, at least one magnetic disk storage device, a flash memory, or a universal flash storage (universal flash storage, UFS). In some embodiments, the processor 110 may run the instructions stored in the internal memory 121 and/or instructions stored in a memory disposed in the processor 110, so that the electronic device is enabled to perform the methods for selecting an image based on burst shooting provided in the embodiments of this application, other function applications, data processing, and the like.

The external memory interface 122 may be configured to connect to an external memory card (such as a micro SD card), to extend a storage capability of the electronic device. The external memory card communicates with the processor 110 through the external memory interface 122, to implement a data storage function. For example, files such as images, music, and videos are stored in the external memory card.

The antenna 1 and the antenna 2 are configured to transmit and receive electromagnetic wave signals. Each antenna in the electronic device may be configured to cover one or more communication bands. Different antennas may be further multiplexed to increase antenna utilization. For example, the antenna 1 may be multiplexed as a diversity antenna in a wireless local area network. In some other embodiments, an antenna may be used in combination with a tuning switch.

The mobile communications module 131 may provide a solution, applied to the electronic device, to wireless communication including 2G, 3G, 4G, 5G, or the like. The mobile communications module 131 may include a filter, a switch, a power amplifier, a low noise amplifier (low noise amplifier, LNA), and the like.

The wireless communications module 132 may provide a solution, applied to the electronic device, to wireless communication including a WLAN (for example, a Wi-Fi network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 132 may be one or more devices integrating at least one communications processing module.

In some embodiments, in the electronic device, the antenna 1 is coupled to the mobile communications module 131, and the antenna 2 is coupled to the wireless communications module 132, so that the electronic device can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device may implement an audio function such as music playback or recording through the audio module 140, the speaker 140A, the receiver 140B, the microphone 140C, the headset jack 140D, the application processor, and the like. The audio module 140 may be configured to convert digital audio information into an analog audio signal for an output, and is also configured to convert an analog audio input into a digital audio signal. The audio module 140 may be further configured to perform audio signal encoding and decoding. In some embodiments, the audio module 140 may be disposed in the processor 110, or some function modules in the audio module 140 are disposed in the processor 110. The speaker 140A, also referred to as a "horn", is configured to convert an audio electrical signal into a sound signal. The electronic device may listen to music or answer a hands-free call through the speaker 140A. The receiver 140B, also referred to as an "earpiece", is configured to convert an audio electrical signal into a sound signal. When using the electronic device to answer a call, a user may place the receiver 140B close to a human ear to answer a voice received by the electronic device through the mobile communications module 131 or the wireless communications module 132. The microphone 140C, also referred to as a "mike" or a "microphone", is configured to convert a sound signal into an electrical signal. When making a call or sending a voice message by using the electronic device, the user may make a sound near the microphone 140C through the mouth of the user, and the microphone 140C may be configured to collect a voice of the user and then convert the voice of the user into an electrical signal. At least one microphone 140C may be disposed in the electronic device. In some other embodiments, two microphones 140C may be disposed in the electronic device, to collect a sound signal and further implement a noise reduction function. In some other embodiments, three, four, or more microphones 140C may be disposed in the electronic device, to collect a sound signal, reduce noise, identify a sound source, implement a directional recording function, and the like. The headset jack 140D is configured to connect to a wired headset. The headset jack 140D may be the USB port 130, or may be a 3.5 mm open mobile terminal platform (open mobile terminal platform, OMTP) standard interface, a cellular telecommunications industry association of the USA (cellular telecommunications industry association of the USA, CTIA) standard interface, or the like.

The electronic device may implement a display function through the GPU, the display 151, the application processor, and the like. The GPU is a microprocessor for image processing, and is connected to the display 151 and the application processor. The GPU is configured to: perform mathematical and geometric calculation, and perform graphics rendering. The processor 110 may include one or more GPUs that execute program instructions to generate or change display information.

The display 151 may be configured to display an image, a video, and the like. The display 151 may include a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), Miniled, MicroLed, Micro-oLed, a quantum dot light emitting diode (quantum dot light emitting diodes, QLED), or the like. In some embodiments, the electronic device may include one or N displays 151, where N is a positive integer greater than 1.

The electronic device may implement a shooting function through the ISP, the camera 153, the video codec, the GPU, the display 151, the application processor, and the like. The ISP may be configured to process data fed back by the camera 153. For example, during shooting, a shutter is pressed, and an optical signal is collected by using the camera 153. Then, the camera 153 converts the collected optical signal into an electrical signal, and transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a shooting scene. In some embodiments, the ISP may be disposed in the camera 153. The camera 153 may be configured to capture a static image or a video. Generally, the camera 153 includes a lens and an image sensor. An optical image of an object is generated through the lens, and is projected onto the image sensor. The image sensor may be a charge-coupled device (charge coupled device, CCD) or a complementary metal-oxide-semiconductor (complementary metal-oxide-semiconductor, CMOS) photoelectric transistor. The image sensor converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in an RGB format, a YUV format, or the like. In some embodiments, the electronic device may include one or N cameras 153, where N is a positive integer greater than 1. For example, the electronic device may include two cameras 153, where one camera 153 is a front-facing camera, and the other camera 153 is a rear-facing camera. For another example, the electronic device may alternatively include three cameras 153, where one camera 153 is a front-facing camera, and the other two cameras 153 are rear-facing cameras; or one camera 153 is a rear-facing camera, and the other two cameras 153 are front-facing cameras. For another example, the electronic device includes four cameras 153, where one camera 153 is a front-facing camera, and the other three cameras 153 are rear-facing cameras.

The button 154 may include a power button, a volume button, and the like. The button 154 may be a mechanical button, or may be a touch button. The electronic device may receive a button input, and generate a button signal input related to a user setting and function control of the electronic device. For example, the electronic device includes a volume up button and a volume down button. Both the volume up button and the volume down button are mechanical buttons. The volume up button is used to control the electronic device to increase a volume, and the volume down button is used to control the electronic device to decrease a volume. In addition, in some other embodiments, when the display 151 displays a preview interface, the electronic device may perform burst shooting in response to an operation that the user presses and holds the volume down button, to obtain a plurality of images captured by the camera.

The sensor module 160 may include one or more sensors, for example, a touch sensor 160A, a fingerprint sensor 160B, or a pressure sensor 160C. In some embodiments, the sensor module 160 may further include a gyroscope sensor, an environment sensor, a range sensor, an optical proximity sensor, a bone conduction sensor, an acceleration sensor, and the like.

The touch sensor 160A may also be referred to as a "touch panel". The touch sensor 160A may be disposed in the display 151. The touch sensor 160A and the display 151 constitute a touchscreen that is also referred to as a "touchscreen". The touch sensor 160A is configured to detect a touch operation performed on or near the touchscreen. The touch sensor 160A may transfer the detected touch operation to the application processor, to determine a type of a touch event, and provide a visual output related to the touch operation through the display 151. In some other embodiments, the touch sensor 160A may also be disposed on a surface of the electronic device at a location different from that of the display 151.

In some other embodiments, the processor 110 may alternatively include one or more interfaces. For example, the interface may be the SIM card interface 152. For another example, the interface may be the USB port 170. For still another example, the interface may be an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), or a general-purpose input/output (general-purpose input/output, GPIO) interface. It can be understood that, in the embodiments of this application, the processor 110 may be connected to different modules of the electronic device through the interface, so that the electronic device can implement different functions, for example, shooting and processing. It should be noted that an interface connection manner of the electronic device is not limited in the embodiments of this application.

It should be understood that the hardware structure shown in FIG. 1 is merely an example. The electronic device in this embodiment of this application may have more or fewer components than those shown in the figure, may combine two or more components, or may have different component configurations. Various components shown in the figure may be implemented in hardware, software, or a combination of hardware and software including one or more signal processing and/or application-specific integrated circuits.

The following describes the embodiments of this application in detail with reference to the schematic structural diagram of the electronic device shown in FIG. 1.

Generally, the electronic device may support a plurality of applications, for example, one or more of the following applications: Camera, Gallery, Drawing, Presentation, Word Processing, Games, Phone, Video Player, Music Player, Email, Instant Messaging, Browser, Calendar, Clock, Payment, APP Gallery, Desktop, Health Management, and the like.

Figure 2:
FIG. 2 is a schematic diagram of a user interface according to an embodiment of this application.

For example, FIG. 2 is a schematic diagram of a graphical user interface according to some embodiments of this application. The graphical user interface is referred to as a user interface for short below. The electronic device displays the user interface by using the display 151. Specifically, the user interface may be a home screen, a leftmost screen, a user interface of an application, or the like. For example, the home screen may be the user interface 200 shown in FIG. 2. As shown in the figure, the user interface 200 may include a status bar 201, a time and weather widget 202, a navigation bar 203 that can be hidden, and icons of a plurality of applications such as a camera icon 204. The status bar 201 may include a name of an operator (China Mobile), a mobile network (for example, 4G), time, and remaining power. In some other embodiments of this application, the status bar 201 may further include one or more of a Bluetooth icon, a Wi-Fi icon, a signal strength icon, a screen lock icon, an icon of a connected device, and the like. The navigation bar 203 may include a back button (back button), a home button (home button), and a menu button (menu button). It may be further understood that, in some other embodiments, the user interface 200 may further include a dock bar. The dock bar may include icons of commonly used applications, such as an icon of Phone, an icon of Messages, an icon of Email, and an icon of Weather. It should be noted that the user may set the icons of the commonly used applications in the dock bar according to a user requirement.

In some other embodiments, as shown in FIG. 2, the electronic device may include a home button 205. The home button 205 may be a physical button or a virtual button. The home button 205 is configured to: based on an operation of the user, return to the home screen from a user interface displayed on the display 151 such as a user interface of an application or a leftmost screen. This can help the user view the home screen at any time and perform an operation on a control (for example, an icon) on the home screen. The foregoing operation may be specifically that the user presses the home button 205. In some other embodiments of this application, the home button 205 may be further integrated with the fingerprint sensor 160B. Therefore, when the user presses the home button 205, the electronic device may collect a fingerprint to confirm an identity of the user. In some other embodiments, the electronic device may not include the home button 205.

It should be understood that, in the following embodiment, after detecting a touch operation performed by a finger of the user (or a stylus or the like) on an icon of an application, the touch sensor 160A of the electronic device reports the touch operation to the processor 110, so that the processor 110 starts the application in response to the touch operation, and displays a user interface of the application on the display 151. For example, after detecting a touch operation performed on the camera icon 204, the touch sensor 160A reports the touch operation performed on the camera icon 204 to the processor 110, so that the processor 110 starts, in response to the touch operation, an application corresponding to the camera icon 204 (which may be referred to as a "camera application" for short below), and displays a user interface of the camera application on the display 151, for example, a preview interface, where the preview interface displays an image captured by the camera 153. It should be noted that, in this embodiment of this application, the camera 153 may be a front-facing camera, or may be a rear-facing camera. For example, the camera 153 is a rear-facing camera. The camera 153 may be one rear-facing camera, or may include two or more rear-facing cameras. For example, if the camera 153 includes two rear-facing cameras, an image displayed on the preview interface is obtained by combining images captured by the two rear-facing cameras. In addition, it should be further noted that the electronic device may further start the camera application in response to another operation such as a shortcut gesture operation (for example, a three-finger screenshot operation) or a voice instruction (for example, "open the Camera"), and display the user interface (for example, the preview interface) of the camera application on the display 151. It should be noted that, when a screen is black, or a screen is locked, or a screen is unlocked and displays a user interface, the electronic device may start the camera application in response to the shortcut gesture operation, the voice instruction, or the like, and display the user interface of the camera application on the display 151.

Figure 3:
FIG. 3 is a schematic diagram of a user interface according to another embodiment of this application.

For example, the preview interface may be a user interface 300 shown in FIG. 3. As shown in the figure, the user interface 300 includes a shooting button 301 and a preview area 310. The preview area 310 is used to display an image captured by the camera 153. In response to a shooting operation (for example, tapping, touching and holding, or pressing) performed by the user on the shooting button 301, the electronic device may obtain one or more images captured by the camera 153, in other words, store the one or more images in the internal memory 121. Specifically, when the camera 153 includes two rear-facing cameras, in response to an operation performed by the user on the shooting button 301, the electronic device may store images captured by the two rear-facing cameras; or may store one composite image, where the composite image is obtained by combining one or more images captured by the two rear-facing cameras. It may be understood that, in the embodiments of this application, the shooting operation may be specifically a burst shooting operation, for example, an operation that the user touches and holds or presses the shooting button 301. In response to the burst shooting operation, the electronic device may obtain, at a specific rate, a plurality of images captured by the camera 153. The specific rate is a rate at which the camera 153 captures images during burst shooting by the electronic device. For example, the specific rate may be 6 frames per second, 8 frames per second, or 10 frames per second. The specific rate may be set by the user, or may default settings in the electronic device. The burst shooting operation may be a touch and hold operation, that is, a touch operation that the finger of the user taps the shooting button 301 and holds down within a preset time. Alternatively, the burst shooting operation may be a pressing operation, that is, a touch operation that the finger of the user taps the shooting button 301 and holds down within a preset time. Alternatively, the burst shooting operation may be a pressing operation, that is, a touch operation that the finger of the user presses the shooting button 301 to a preset pressure threshold.

In some embodiments, the electronic device ends the burst shooting only after the foregoing burst shooting operation ends. For example, the electronic device ends the burst shooting when the foregoing touch and hold operation ends (for example, the finger of the user is lifted from the touchscreen).

It should be noted that, in the embodiments of this application, the electronic device may further perform burst shooting in response to another operation (for example, a shortcut gesture operation, a voice input, or an operation of pressing and holding the volume down button). An operation manner of triggering the electronic device to perform burst shooting is not limited in the embodiments of this application.

In some other embodiments of this application, the user interface 300 may further include a button 302, a button 303, an area 304, or some function buttons (for example, a setting button 305 and a flash button). The button 302 is configured to control switching between a front-facing camera and a rear-facing camera. The button 303 is configured to quickly open a gallery. The area 304 may include mode buttons such as PHOTO, VIDEO, PRO, PORTRAIT, APERTURE, NIGHT, or MORE. This helps the user use the electronic device to obtain an expected image, view the obtained image, and the like, and this helps improve user experience.

In response to that the user manually taps the shooting button 301, it may be very difficult for the electronic device to capture an image captured by the camera 153 in some special scenarios. Therefore, to improve a possibility or efficiency with which the electronic device captures an image captured by the camera 153 in some special scenarios, the user usually performs burst shooting by using the electronic device. For example, when the electronic device captures an instant expression (for example, an instant expression of look-back) or an action captured by the camera 153, a possibility of successful capturing may be increased through burst shooting. For another example, the electronic device may capture, through burst shooting, an action or consecutive actions (for example, postures at different moments in the air during diving) captured by the camera 153. For another example, in a scenario of taking a group photo of a lot of people, the electronic device may also capture, through burst shooting, images captured by the camera 153. This helps the electronic device capture an image in which all people do not close the eyes.

However, the electronic device automatically obtains a plurality of images through burst shooting and stores the plurality of images, but not all the plurality of images are expected by the user. For example, some images are unclear, overexposed or overdark, have color blocks, have color casts, or have no aesthetic effect. The user usually needs to perform screening on the plurality of obtained images, which is relatively cumbersome and causes relatively poor user experience. In some embodiments, the electronic device may automatically determine an image with relatively high image quality from the plurality of images obtained through burst shooting. For example, the image with relatively high image quality may be an image with one or more parameters such as an image definition, a contrast, a brightness, a light uniformity, a saturation, and a detail richness that meet a preset condition. In this technical solution, although the electronic device can automatically determine an image with relatively high image quality from a plurality of images obtained through burst shooting, not all images with relatively high image quality are satisfactory to the user.

In view of this, an embodiment of this application provides a method for selecting an image based on burst shooting, to automatically select an image satisfactory to a user during burst shooting by an electronic device. This helps improve quality of an image obtained during burst shooting by the electronic device.

With reference to the electronic device shown in FIG. 1, the following describes in detail a method for selecting an image based on burst shooting in an embodiment of this application.

Figure 4:
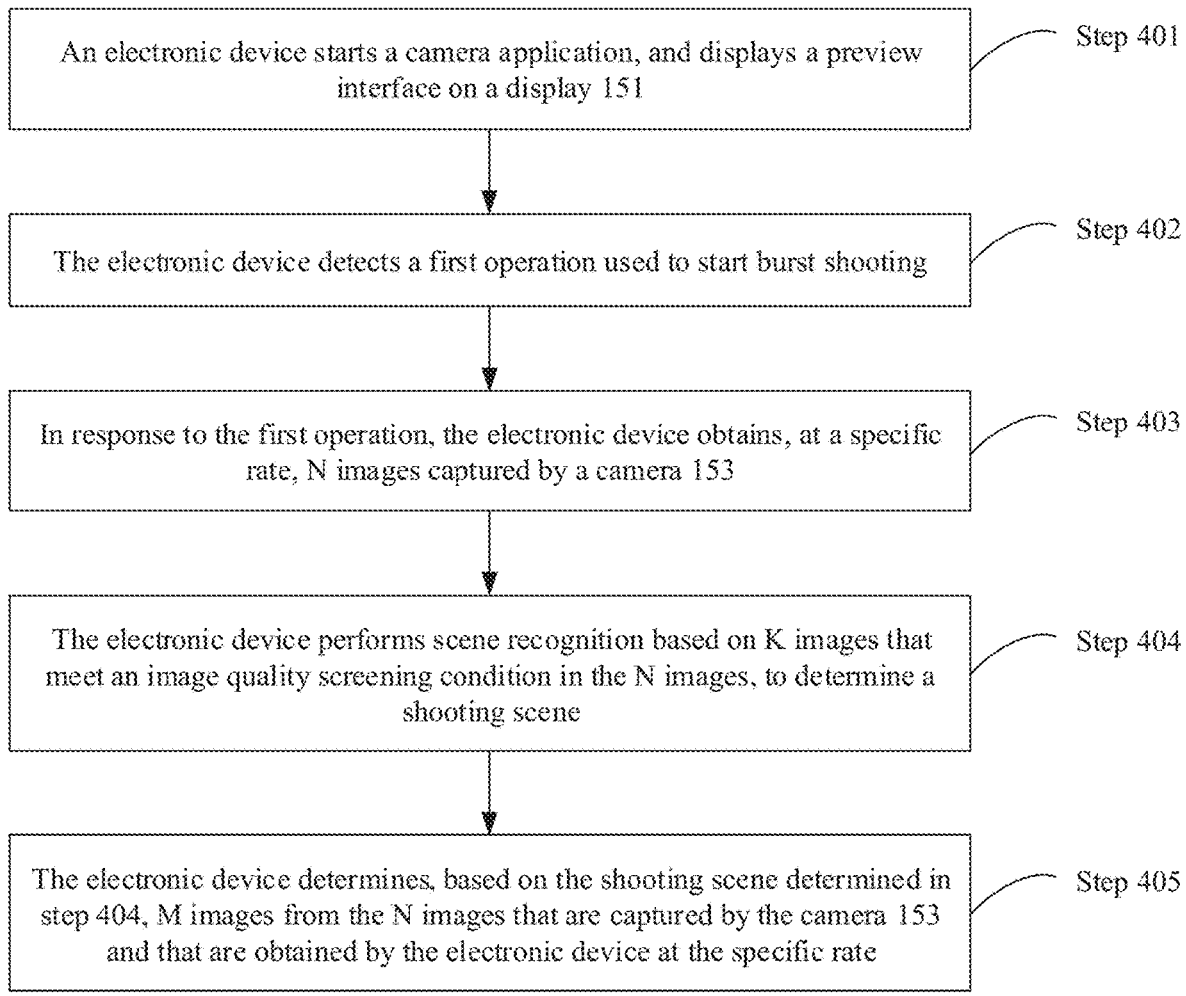
FIG. 4 is a schematic flowchart of a method for selecting an image based on burst shooting according to an embodiment of this application.

For example, FIG. 4 is a schematic flowchart of a method for selecting an image based on burst shooting according to an embodiment of this application. The method specifically includes the following steps.

Step 401: The electronic device starts a camera application, and displays a preview interface on the display 151, where the preview interface is used to display an image captured by the camera 153.

It should be noted that, for a manner in which the electronic device starts the camera application and displays the preview interface on the display 151, refer to the foregoing related descriptions. Details are not described herein again.

Step 402: The electronic device detects a first operation used to start burst shooting. For example, the first operation may be a touch and hold operation performed by a user on a shooting button, an operation of pressing and holding a volume down button, a gesture operation of quickly starting burst shooting, or a voice input operation for burst shooting.

Step 403: In response to the first operation, the electronic device obtains, at a specific rate, N images captured by the camera 153, where N is a positive integer greater than or equal to 2.

Specifically, the electronic device obtains, at the specific rate, the N images captured by the camera 153 within first duration. For example, the first operation is the operation that the user touches and holds the shooting button, and the first duration is duration in which the user touches and holds the shooting button. For another example, the first operation is the operation that the user presses and holds the volume down button, and the first duration is duration in which the user presses and holds the volume down button.

It should be noted that the specific rate may be preset in the electronic device before delivery of the electronic device, or may be correspondingly set by the user according to a user requirement. For example, the specific rate may be 6 frames per second, 8 frames per second, or 10 frames per second. For example, the specific rate is 6 frames per second. In response to the first operation, the electronic device may obtain six images captured by the camera 153 per second.

Step 404: The electronic device performs scene recognition based on K images that meet an image quality screening condition in the N images, to determine a shooting scene, where K is a positive integer less than or equal to N. Specifically, a value of K may be preset in the electronic device according to an actual situation. For example, K may be a positive integer such as 2, 3, or 4.

In some embodiments, each time the electronic device obtains an image captured by the camera 153, the electronic device determines whether the image meets the image quality screening condition. When the image does not meet the image quality screening condition, the electronic device discards the image. This helps increase utilization of storage space of the electronic device. When the image meets the image screening condition, the electronic device caches the image. When there are K cached images, the electronic device performs scene recognition based on the K images, to determine a shooting scene. This helps improve efficiency of image selection by the electronic device. For example, if N is 12 and K is 3, in response to the first operation, the electronic device obtains, at the specific rate, 12 images captured by the camera 153. After obtaining the $1^{st}$ image captured by the camera 153, the electronic device may determine whether the $1^{st}$ image meets the image quality screening condition; and if determining that the $1^{st}$ image meets the image quality screening condition, the electronic device caches the $1^{st}$ image; or if determining that the $1^{st}$ image does not meet the image quality screening condition, the electronic device discards the $1^{st}$ image. Sequentially, each time the electronic device obtains the $2^{nd}$ image, the $3^{rd}$ image, or the $i^{th}$ image, the electronic device determines whether the image meets the image quality screening condition. After the electronic device obtains the $5^{th}$ image captured by the camera 153, if there are three cached images, the electronic device performs scene recognition based on the three cached images, to determine a shooting scene. The electronic device may further continue to obtain the $6^{th}$ image, and then determine whether the $6^{th}$ image meets the image quality screening condition, until the electronic device obtains the $12^{th}$ image and burst shooting ends. After determining whether the $12^{th}$ image meets the image quality screening condition, the electronic device determines an image that meets the image quality screening condition in the 12 images captured by the camera 153.

However, for example, the first operation is touching and holding the shooting button. When the electronic device performs burst shooting, a quantity of obtained images is related to a time length in which the user touches and holds the shooting button. However, when the user touches and holds the shooting button for a relatively short time, a quantity of images obtained by the electronic device at the specific rate may be relatively small, and even cannot meet a quantity of images that need to be obtained by the electronic device through screening. Therefore, in some embodiments, when the quantity of images obtained by the electronic device at the specific rate reaches a first threshold, the electronic device sequentially determines, in an image obtaining time sequence, whether the obtained images meet the image quality screening condition. It should be noted that the first threshold in this embodiment of this application is greater than or equal to the quantity of images that need to be finally obtained by the electronic device through screening. For example, if the quantity of images that need to be finally obtained by the electronic device through screening is M, the first threshold may be M, or may be a positive integer greater than M. Specifically, the first threshold may be preset in the electronic device, or may be determined by the electronic device according to a preset policy. This is not limited. For example, when M is 4, the first threshold may be 4, or may be a positive integer greater than 4, such as 5 or 6. For example, the first threshold is 4 and K is 3. When obtaining four images captured by the camera 153, the electronic device may determine, starting from the obtained $1^{st}$ image, whether the obtained image meets the image quality screening condition. After determining that the $5^{th}$ image meets the image quality screening condition, the electronic device determines that there are three images that meet the image quality screening condition, and performs scene recognition based on the three images, to determine a shooting scene.

In some other embodiments, after obtaining the N images captured by the camera, in other words, after burst shooting ends, the electronic device may further determine whether each of the N images meets the image quality screening condition, then determines K of the N images that each meet the image quality screening condition, and performs scene recognition based on the K images, to determine a shooting scene. An example in which N is 3 is used. For example, after burst shooting ends, the electronic device obtains 10 images captured by the camera 153, and then the electronic device separately determines whether the 10 images meet the image quality screening condition. If the electronic device determines that six of the 10 images meet the image quality screening condition, the electronic device may randomly select three of the six images that meet the image quality screening condition, to perform scene recognition. In addition, the electronic device may further determine, from the six images that meet the image quality screening condition, three images that meet the image quality screening condition and that are obtained in different time periods, to perform scene recognition. This helps improve scene recognition accuracy. For example, if the six images that meet the image quality screening condition in the 10 images that are captured by the camera 153 and that are obtained by the electronic device are respectively the $1^{st}$ image, the $3^{rd}$ image, the $4^{th}$ image, the $6^{th}$ image, the $8^{th}$ image, and the $9^{th}$ image, the three images that meet the image quality screening condition and that are obtained by the electronic device in different time periods may be the $1^{st}$ image, the $4^{th}$ image, and the $8^{th}$ image in the $1^{st}$ image, the $3^{rd}$ image, the $4^{th}$ image, the $6^{th}$ image, the $8^{th}$ image, and the $9^{th}$ image.

In some embodiments of this application, the image quality screening condition may include one or more of an image definition screening condition, an image brightness screening condition, an image exposure screening condition, an image saturation screening condition, or an image contrast screening condition. For example, the image definition screening condition may be that an image definition is within a threshold range. The threshold range may be preset in the electronic device, or a policy for determining the threshold range may be preset in the electronic device. In addition, in this embodiment of this application, the image quality screening condition may further include another screening condition related to image quality, for example, a condition indicating whether there is a color block in an image or a condition indicating whether there is a color cast in an image. By using the foregoing image quality screening condition, the electronic device may preliminarily obtain an image with relatively high image quality (for example, a relatively clear and non-blurred image) from a plurality of obtained images through screening. This facilitates subsequent processing.

Figure 5A:
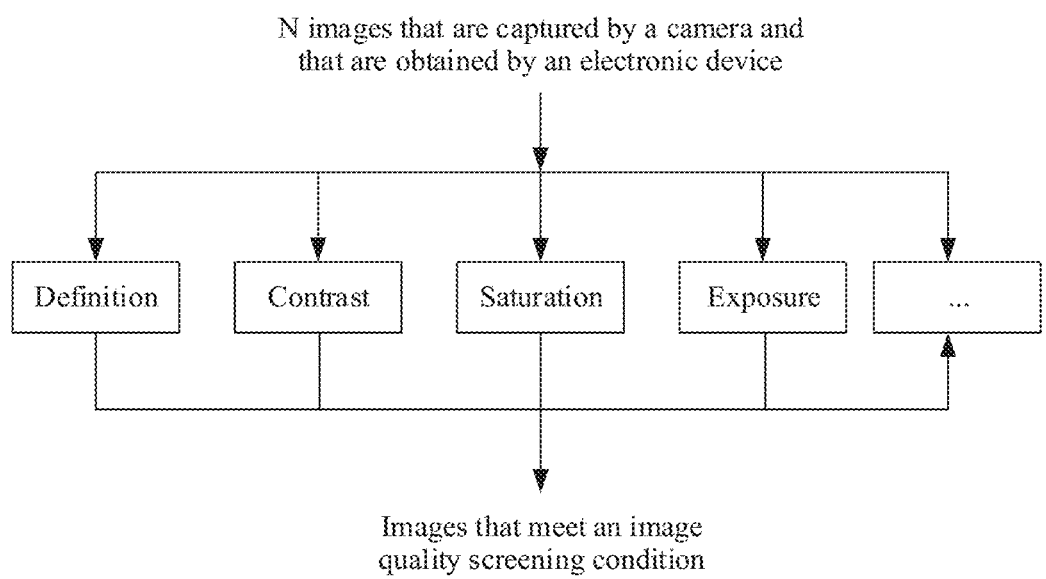
FIG. 5a is a schematic diagram of determining an image based on an image quality screening condition according to an embodiment of this application.

For example, as shown in FIG. 5a, the image quality screening condition includes the image definition screening condition, the image contrast screening condition, the image saturation screening condition, the image exposure screening condition, and the like. The electronic device may determine whether each image obtained by the electronic device meets the image quality screening condition such as the image definition screening condition, the image contrast screening condition, the image saturation screening condition, and the image exposure screening condition. When the image meets the image quality screening condition such as the image definition screening condition, the image contrast screening condition, the image saturation screening condition, and the image exposure screening condition, the electronic device caches the image that meets the image quality screening condition. Specifically, the electronic device may cache the image into a corresponding memory, for example, the internal memory 121, an external memory, or another memory.

The image quality screening condition may be preset in the electronic device before delivery of the electronic device, or may be selected according to an actual user requirement. For example, if the user selects a definition and an exposure, the image quality screening condition includes the image definition screening condition and the image exposure screening condition.

The following describes in detail a specific manner in which the electronic device determines a shooting scene.

For example, the electronic device may perform, by using an artificial intelligence (artificial intelligence, AI) technology, scene recognition on the K images that meet the image quality screening condition. In some embodiments, the electronic device may perform, by using an NPU, scene recognition on the K images that meet the image quality screening condition, to determine the shooting scene. For example, the NPU may perform scene recognition based on a neural network algorithm.

In some embodiments, the electronic device performs scene recognition based on pre-configured scene recognition priority information and the K images that meet the image quality screening condition, to determine the shooting scene.

Figure 5B:
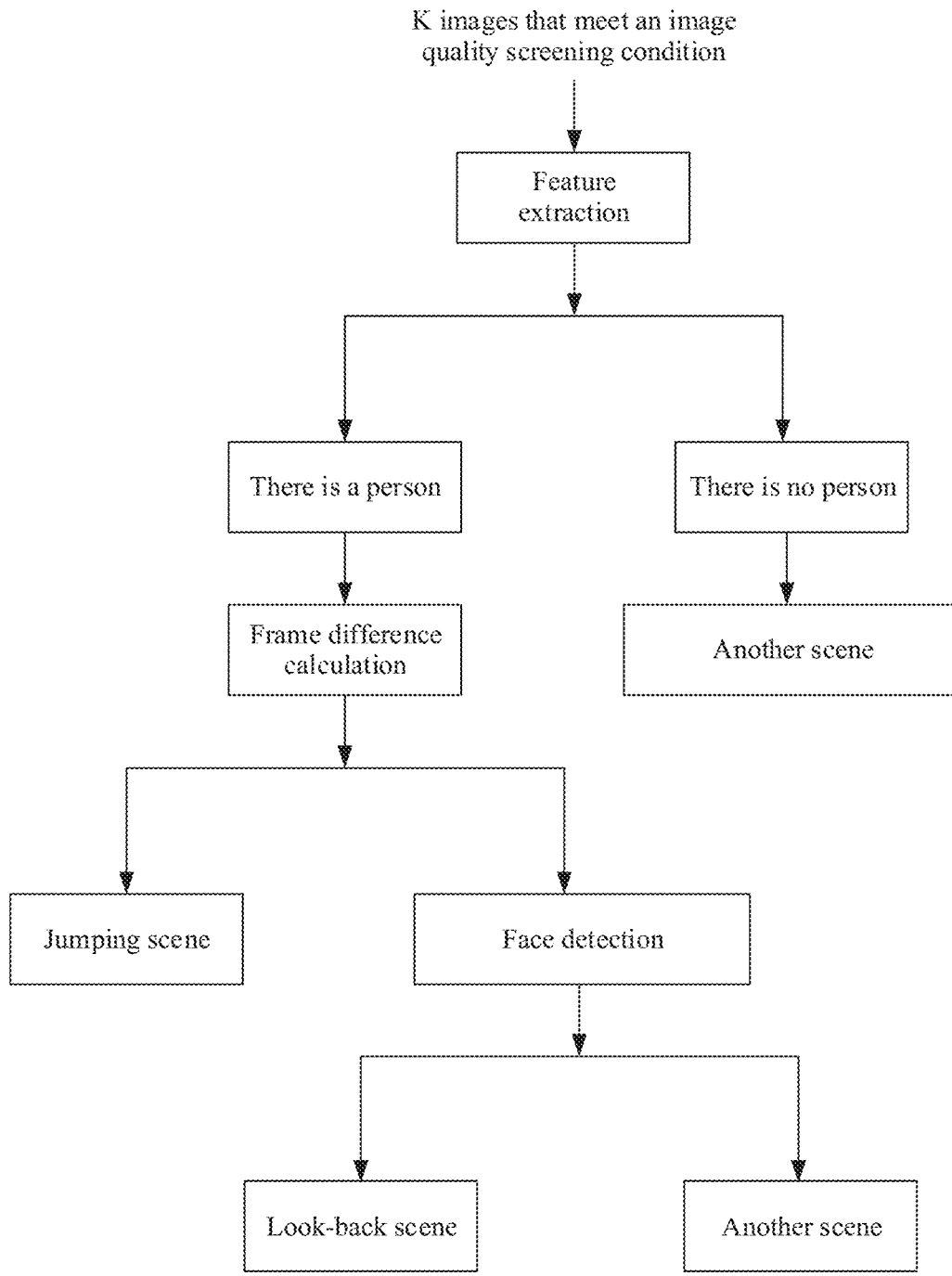
FIG. 5b is a schematic flowchart of a scene recognition method according to an embodiment of this application.

For example, as shown in FIG. 5b, the scene recognition priority information that is preconfigured in the electronic device is used to indicate that a descending order of scene recognition priorities is: a jumping scene, a look-back scene, and another scene. The electronic device may perform, in a priority sequence of recognizing the jumping scene, the look-back scene, and the another scene, scene recognition based on the K images that meet the image quality screening condition. Specifically, the electronic device first performs feature extraction on the N images that meet the image quality screening condition, to identify whether there is a person in the images. For example, the electronic device may extract a grayscale feature, an edge feature, or a texture feature from the N images that meet the quality screening condition, to identify whether there is a person in the images. If identifying that there is no person in the images, the electronic device determines that the shooting scene is the another scene; or if identifying that there is a person in the images, the electronic device obtains a human body frame, and then determines, based on a frame difference algorithm, whether the shooting scene is the jumping scene. Specifically, the electronic device performs frame difference calculation in an image obtaining time sequence to obtain a plurality of calculation results, and determines, based on the plurality of obtained calculation results, whether the shooting scene is the jumping scene. For example, N is 3. In this case, the electronic device obtains an image a, an image b, and an image c in the time sequence, and then the electronic device performs frame difference calculation on the image a, the image b, and the image c. Specifically, a height of a human body frame in the image a is subtracted from a height of a human body frame in the image b to obtain a first calculation result, the height of the human body frame in the image b is subtracted from a height of a human body frame in the image c to obtain a second calculation result, and whether the shooting scene is the jumping scene is determined based on the first calculation result and the second calculation result. When the electronic device determines that the shooting scene is the jumping scene, the scene recognition procedure ends. In addition, when determining that the shooting scene is not the jumping scene, the electronic device may separately calculate face angles in the N images based on a face detection algorithm, and then the electronic device determines, based on the face angles in the N images, whether the shooting scene is the look-back scenario. When the electronic device determines that the shooting scene is the look-back scene, the scene recognition procedure ends. However, if the electronic device determines that the shooting scene is not the look-back scene, the electronic device determines that the shooting scene is the another scene.

In addition, when the scene recognition priority information that is preconfigured in the electronic device is used to indicate that a descending order of scene recognition priorities is: a look-back scene, a jumping scene, and another scene, the electronic device may first perform face detection based on a face detection algorithm, calculate face angles in the K images, and determine whether the shooting scene is the look-back scene. When determining that the shooting scene is not the look-back scene, the electronic device determines, based on a frame difference algorithm, whether the shooting scene is the jumping scene. When determining that the shooting scene is not the jumping scene, the electronic device determines that the shooting scene is the another scene.

The foregoing is only a specific implementation of scene recognition in this embodiment of this application. In addition, in some other embodiments, a group photo scene, a scene of riding on a swing, a scene of playing on a slide, and the like may be further preset in the electronic device in this embodiment of this application.

Step 405: The electronic device determines, based on the shooting scene determined in step 404, M images from the N images that are captured by the camera 153 and that are obtained by the electronic device at the specific rate, where M is a positive integer greater than or equal to 1. For example, a value of M may be set according to a user requirement, or may be set in the electronic device before delivery. For example, M is 4 or 5. It should be noted that M is less than or equal to N.

In this embodiment of this application, the electronic device performs, based on a shooting scene, screening on images obtained through burst shooting. Therefore, compared with the prior art in which an image is selected based only on a parameter used to evaluate image quality such as a definition or a contrast, this helps improve quality of an image obtained by the electronic device through screening, thereby improving user satisfaction with an image that is automatically obtained through screening during burst shooting by the electronic device.

In some embodiments, the electronic device may determine an image content screening condition based on the determined shooting scene, and then the electronic device determines the M images that meet the image content screening condition from the N images that are captured by the camera 153 and that are obtained at the specific rate. This helps improve quality of an image obtained by the electronic device through screening, and make implementation of the electronic device easier.

For example, the electronic device determines, based on the shooting scene determined in step 404, the M images from Q images that meet the image quality screening condition. The Q images that meet the image quality screening condition are all images that meet the image quality screening condition in the N images. This helps further improve quality of an image obtained by the electronic device through screening, and further helps improve efficiency of image screening by the electronic device. Herein, Q is a positive integer less than or equal to N and greater than or equal to M. For example, the electronic device determines the image content screening condition based on the shooting scene, and then the electronic device determines the M images that meet the image content screening condition from the Q images that meet the image quality screening condition.

It should be noted that, in some embodiments of this application, different shooting scenes may correspond to different image content screening conditions. The image content screening condition may include one or more conditions. For example, for the jumping scene, the image content screening condition includes at least one of the following conditions: an image composition screening condition, an action stretching screening condition, a smile screening condition, a condition indicating whether the eye is closed, a jumping height screening condition, a jumping stage screening condition, and a landing stage screening condition. In this way, the electronic device selects images with relatively good definitions and relatively natural actions and expressions in different jumping stages. It should be further noted that, for the jumping scene, priorities of conditions such as the image composition screening condition, the action stretching screening condition, the smile screening condition, the condition indicating whether the eye is closed, the jumping height screening condition, the jumping stage screening condition, and the landing stage screening condition may be preset before delivery of the electronic device, or may be set by the user according to a user requirement. In addition, in this embodiment of this application, different image content screening policies corresponding to different shooting scenes may be preset in the electronic device before delivery of the electronic device, or may be set by the user according to the user requirement. This is not limited.

For the look-back scene, the image content screening condition may include one or more conditions such as a condition of performing screening on face twist angles generated after looking back, a smile screening condition, a condition indicating whether the eye is closed, and an image composition screening condition. For the scene of playing on a slide and the scene of riding on a swing, a same image content screening condition may be used. For example, for the scene of playing on a slide and the scene of riding on a swing, the image content screening condition may include one or more conditions such as an image composition screening condition and an action stretching screening condition. For a walking scene, the image content screening condition may include one or more conditions such as an image composition screening condition and a walking posture screening condition.

In addition, in some other embodiments, the electronic device may further determine, based on the shooting scene and another algorithm, the M images from the Q images that meet the image quality screening condition.

Figure 5C:
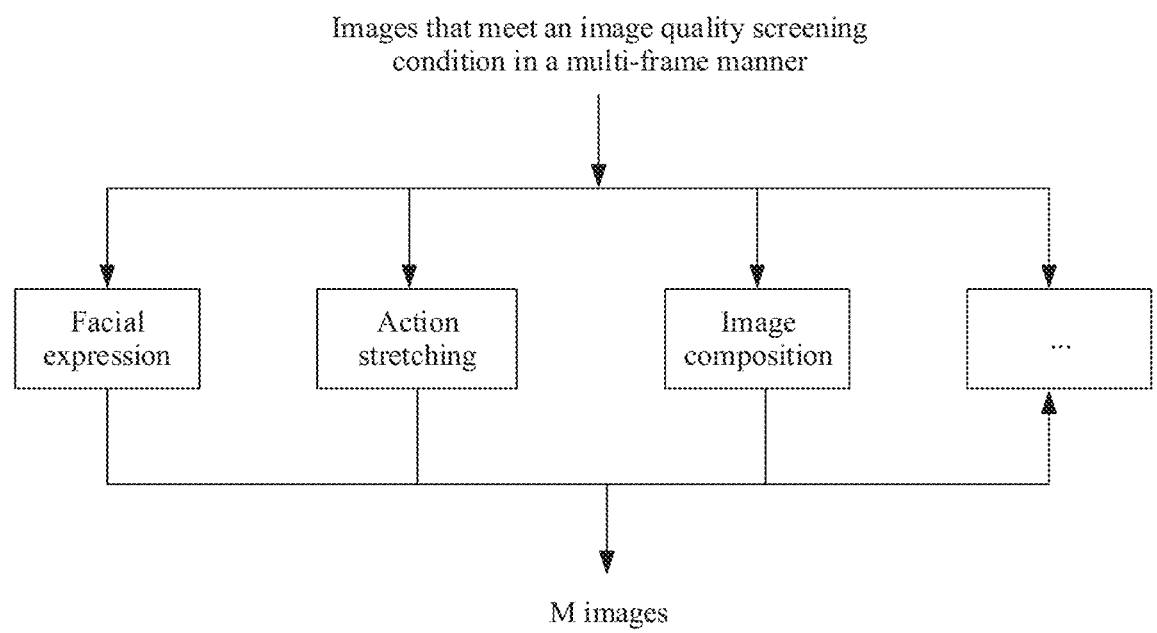
FIG. 5c is a schematic diagram of a method for determining M images based on a shooting scene according to an embodiment of this application.

For example, as shown in FIG. 5C, the image content screening condition includes a plurality of conditions such as a facial expression screening condition, an action stretching screening condition, and an image composition screening condition. In this case, the electronic device determines, from the Q images that meet the image quality screening condition, the M images that meet the plurality of conditions such as the facial expression screening condition, the action stretching screening condition, and the image composition screening condition.

In some embodiments, the electronic device may automatically store the M determined images in a gallery for ease of searching by the user. The electronic device may further delete an image in the Q images other than the M images. This helps increase utilization of storage space.

Figure 6A:
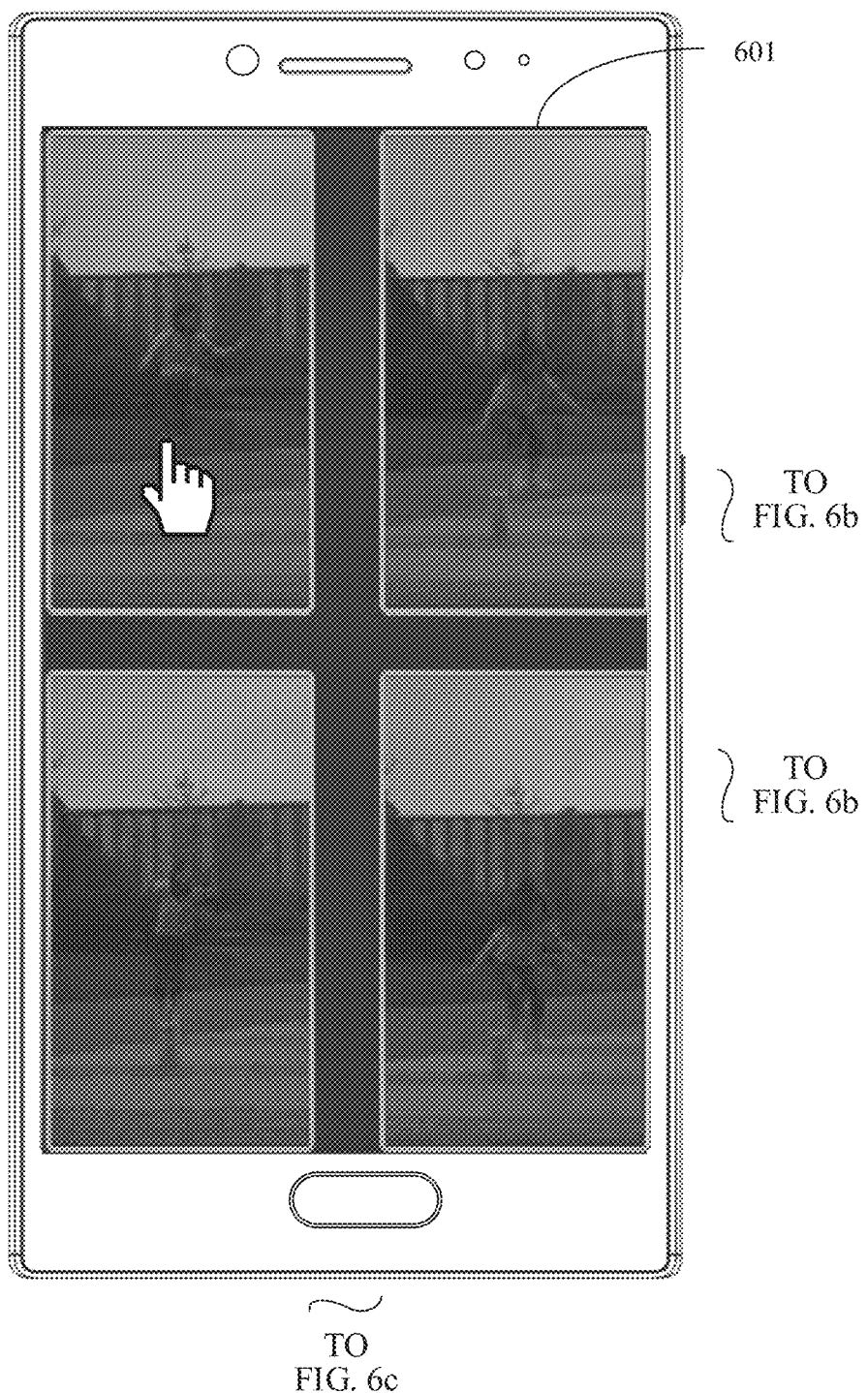
FIG. 6a to FIG. 6c are a schematic diagram of a user interface according to another embodiment of this application.

In some other embodiments, after determining the M images, the electronic device may further display the M images on the display 151. For example, M is 4. As shown in FIG. 6a, the electronic device displays a user interface

601 on the display 151, and the user interface 601 includes four determined images. For example, in response to an operation performed by the user on an image in the four images, the electronic device may display the image on the display 151 in full screen. This helps the user preview or view an image determined by the electronic device. Specifically, the operation performed by the user on an image in the four images may be an operation that the user touches and holds the image in the four images, or may be an operation that the user presses the image in the four images, or the like. For example, the electronic device displays the user interface 601 on the display 151, and in response to an operation performed by the user on the upper-left image in the four images, the electronic device displays the upper-left image in full screen, which is a user interface 602 shown in FIG. 6b. In some embodiments of this application, when the electronic device displays, in response to an operation performed by the user on an image in the four images, the image in the M images on the display 151 in full screen, in response to the operation performed by the user on the image displayed in full screen, the electronic device may further exit full-screen display and return to the previous user interface. For example, as shown in FIG. 6b, when the electronic device displays the user interface 602 on the display 151 in response to the operation performed by the user on the upper-left image in the four images included in the user interface 601, where the user interface 602 is a user interface that displays the upper-left image in the four images included in the user interface 601 in full screen, in response to the operation performed by the user on the user interface 602, the electronic device may exit the user interface 602 and return to the user interface 601.

Figure 6B:
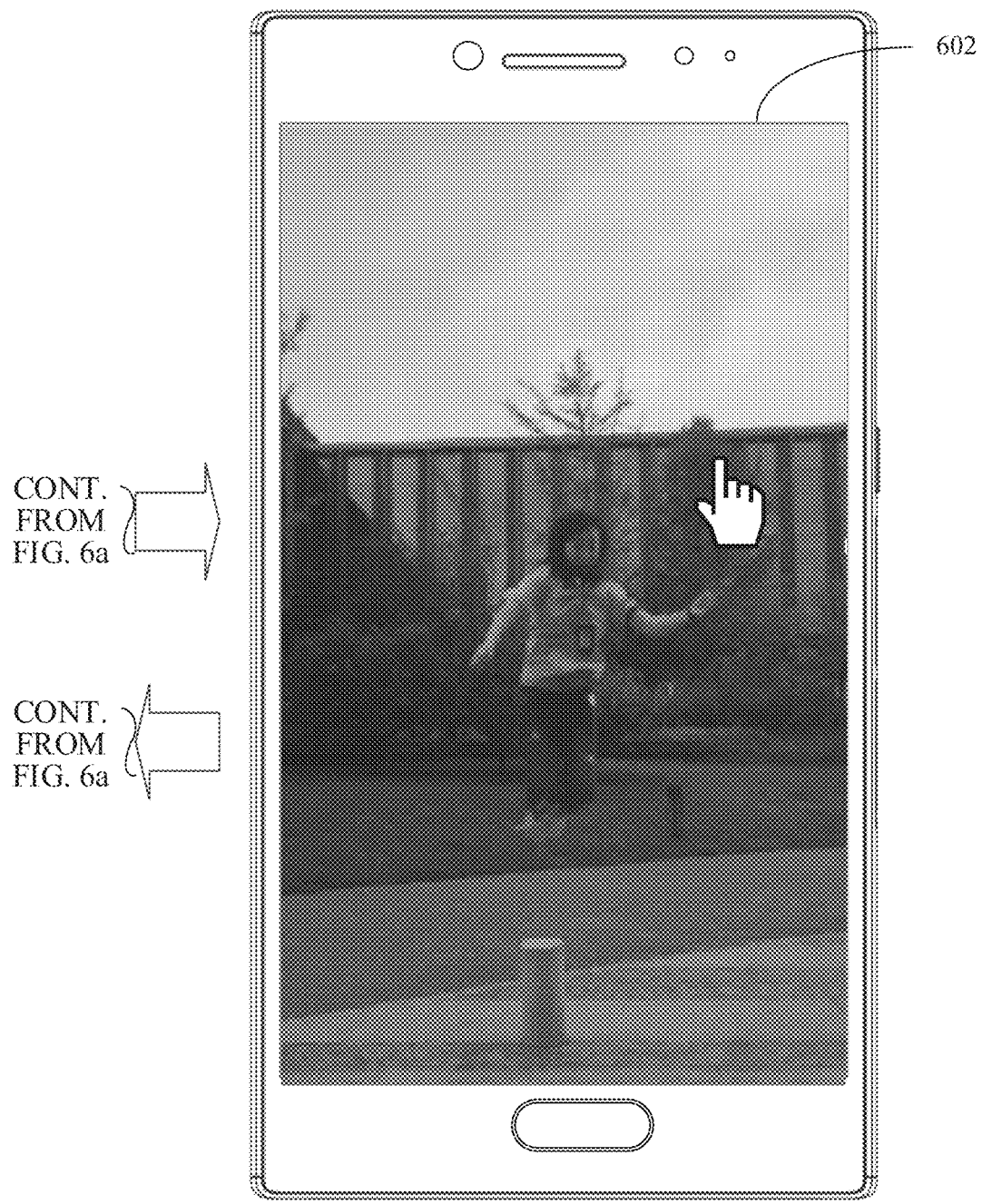
Figure 6C:
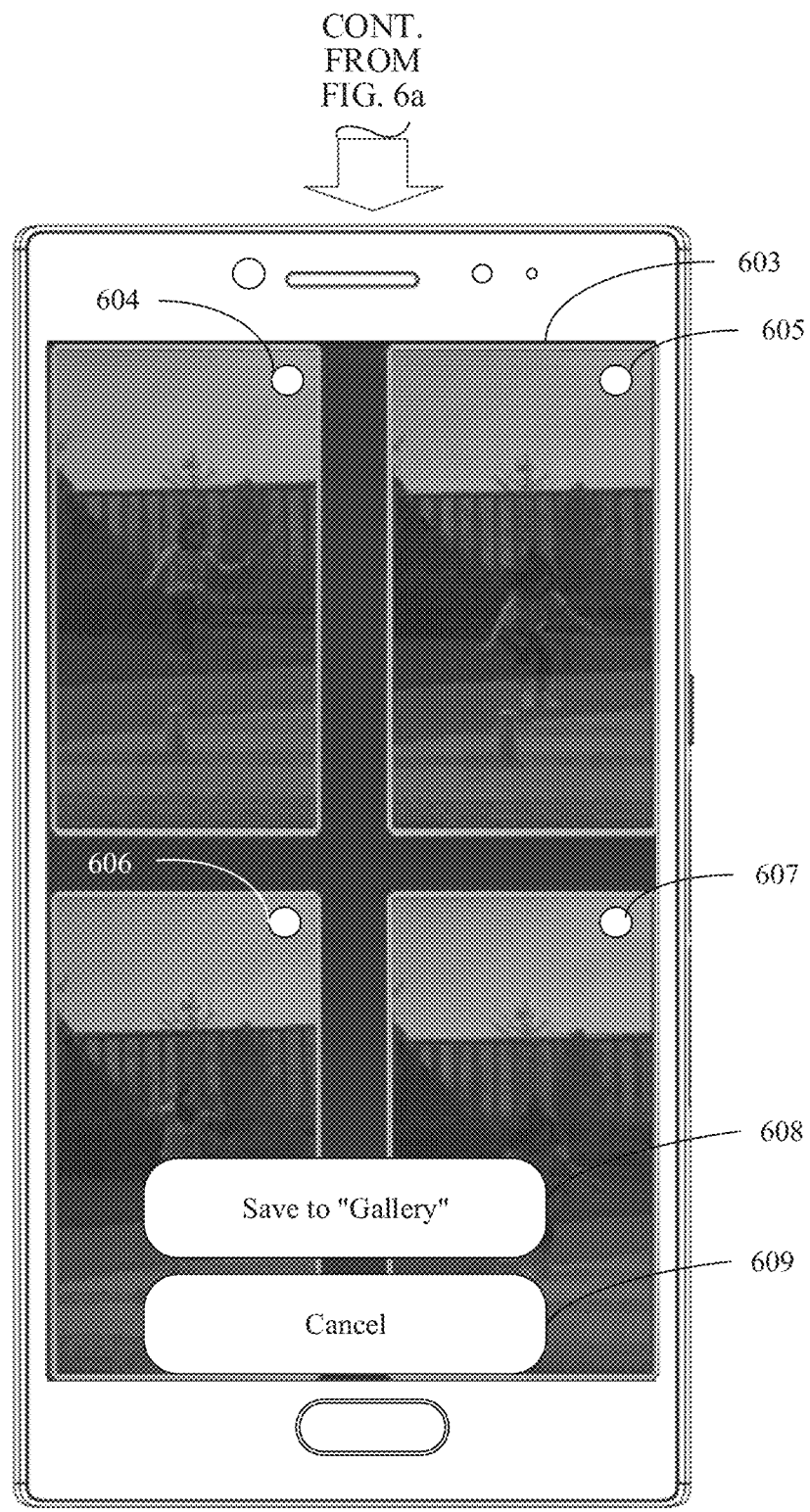

In addition, as shown in FIG. 6b, when displaying the user interface 601 on the display 151, the electronic device may further display a user interface 603 on the display 151 in response to a second operation. The user interface 603 includes the four determined images, image selection boxes 604, 605, 606, and 607, and buttons 608 and 609. When the user selects the image selection boxes 604, 605, and 606, in response to an operation performed by the user on the button 608, the electronic device may store the upper-left image, the upper-right image, and the lower-left image in the user interface 603 into "Gallery", and delete the lower-right image. This helps improve interaction between the user and the electronic device. Specifically, the second operation is different from an operation of triggering the electronic device to display an image in the four images in full screen. For example, the second operation may be a touch operation performed by the user on any one of the four images. The electronic device may return to the user interface 601 in response to an operation performed by the user on the button 609.

In addition, in some other embodiments of this application, the electronic device may further perform down-sampling on an image that is captured by the camera 153 and that is obtained at a specific rate, and then perform a subsequent step based on an image obtained through down-sampling. This helps reduce a data processing amount of the electronic device and improve efficiency of image screening by the electronic device.

Figure 7:
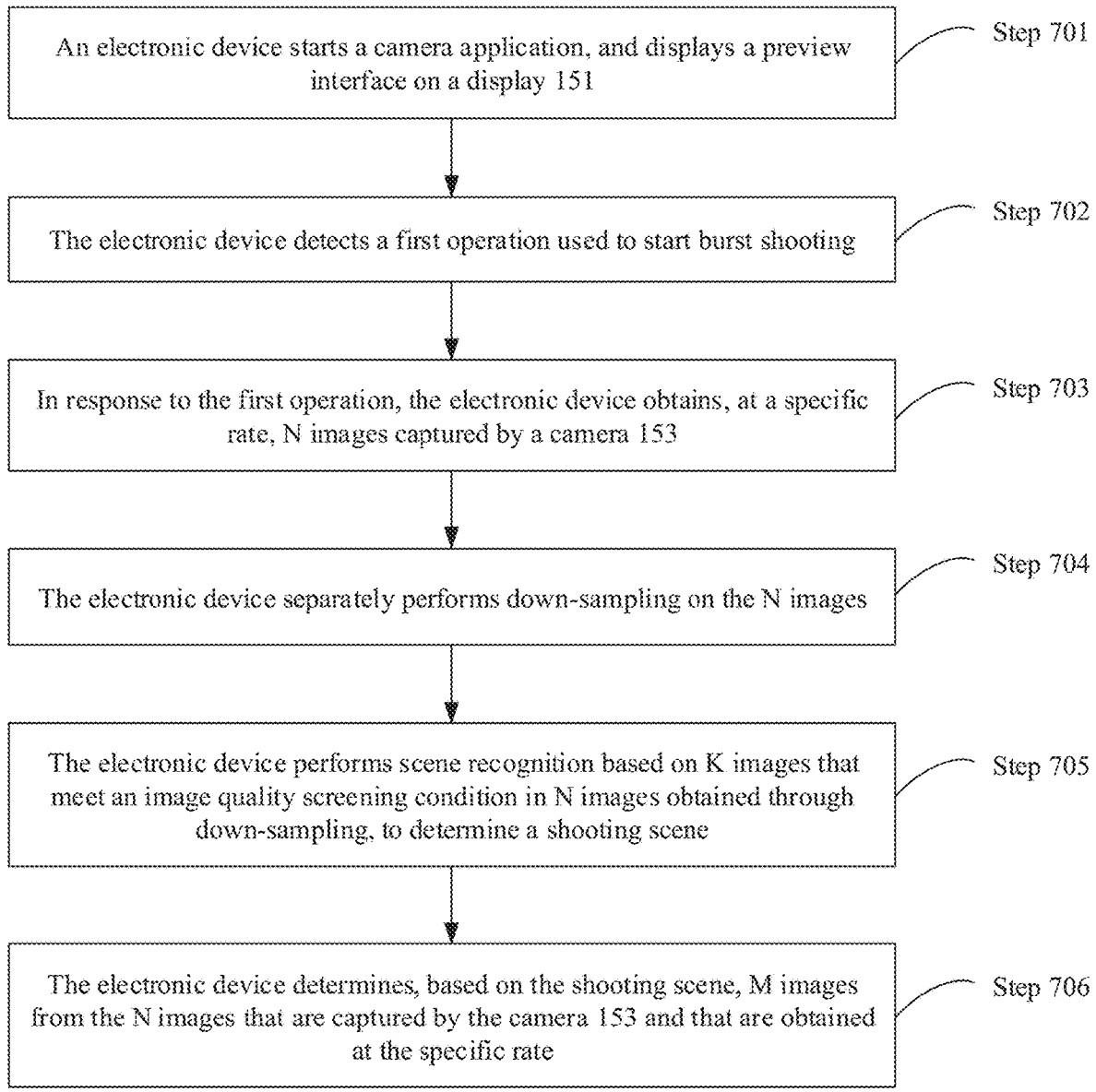
FIG. 7 is a schematic flowchart of a method for selecting an image based on burst shooting according to another embodiment of this application.

For example, FIG. 7 is a schematic flowchart of a method for selecting an image based on burst shooting according to other embodiments of this application. The method specifically includes the following steps.

Step 701: An electronic device starts a camera application, and displays a preview interface on a display 151, where the preview interface is used to display an image captured by a camera 153.

Step 702: The electronic device detects a first operation used to start burst shooting.

Step 703: In response to the first operation, the electronic device obtains, at a specific rate, N images captured by the camera 153.

For specific implementations of step 701 to step 703, refer to the implementations of step 401 to step 403.

Step 704: The electronic device separately performs down-sampling on the N images.

In some embodiments, each time the electronic device obtains, at the specific rate, an image captured by the camera 153, the electronic device performs sampling on the image. In other words, the electronic device obtains, at the specific rate, the image captured by the camera 153, and simultaneously performs down-sampling on the image. This helps improve down-sampling efficiency. When the electronic device obtains, at the specific rate, the $N^{th}$ image captured by the camera 153, in other words, after burst shooting ends, down-sampling performed by the electronic device on the N images that are captured by the camera 153 and that are obtained at the specific rate is basically completed.

However, for example, the first operation is touching and holding a shooting button. When the electronic device performs burst shooting, a quantity of obtained images is related to a time length in which a user touches and holds the shooting button. However, when the user touches and holds the shooting button for a relatively short time, a quantity of images obtained by the electronic device at the specific rate may be relatively small, and even cannot meet a quantity of images that need to be obtained by the electronic device through screening. Therefore, in some embodiments, when the quantity of images obtained by the electronic device at the specific rate reaches a first threshold, the electronic device performs down-sampling on the images that are captured by the camera 153 and that are obtained at the specific rate. It should be noted that the first threshold in this embodiment of this application is greater than or equal to the quantity of images that need to be finally obtained by the electronic device through screening. For example, if the quantity of images that need to be finally obtained by the electronic device through screening is M, the first threshold may be M, or may be a positive integer greater than M. Specifically, the first threshold may be preset in the electronic device, or may be determined by the electronic device according to a preset policy. This is not limited. For example, when M is 4, the first threshold may be 4, or may be a positive integer greater than 4, such as 5 or 6. For example, the first threshold is 4 and K is 3. When obtaining four images captured by the camera 153, the electronic device may perform down-sampling starting from the obtained $1^{st}$ image.

In some other embodiments, after obtaining, at the specific rate, the N images captured by the camera 153, the electronic device may separately perform down-sampling on the N images.

The following uses an image as an example to specifically describe a processing manner in which the electronic device performs down-sampling in this embodiment of this application. For example, an image that is captured by the camera 153 and that is obtained by the electronic device at the specific rate is a first-resolution image, and the electronic device performs down-sampling on the first-resolution image to obtain a second-resolution image, where a second resolution is less than a first resolution.

Figure 8A:
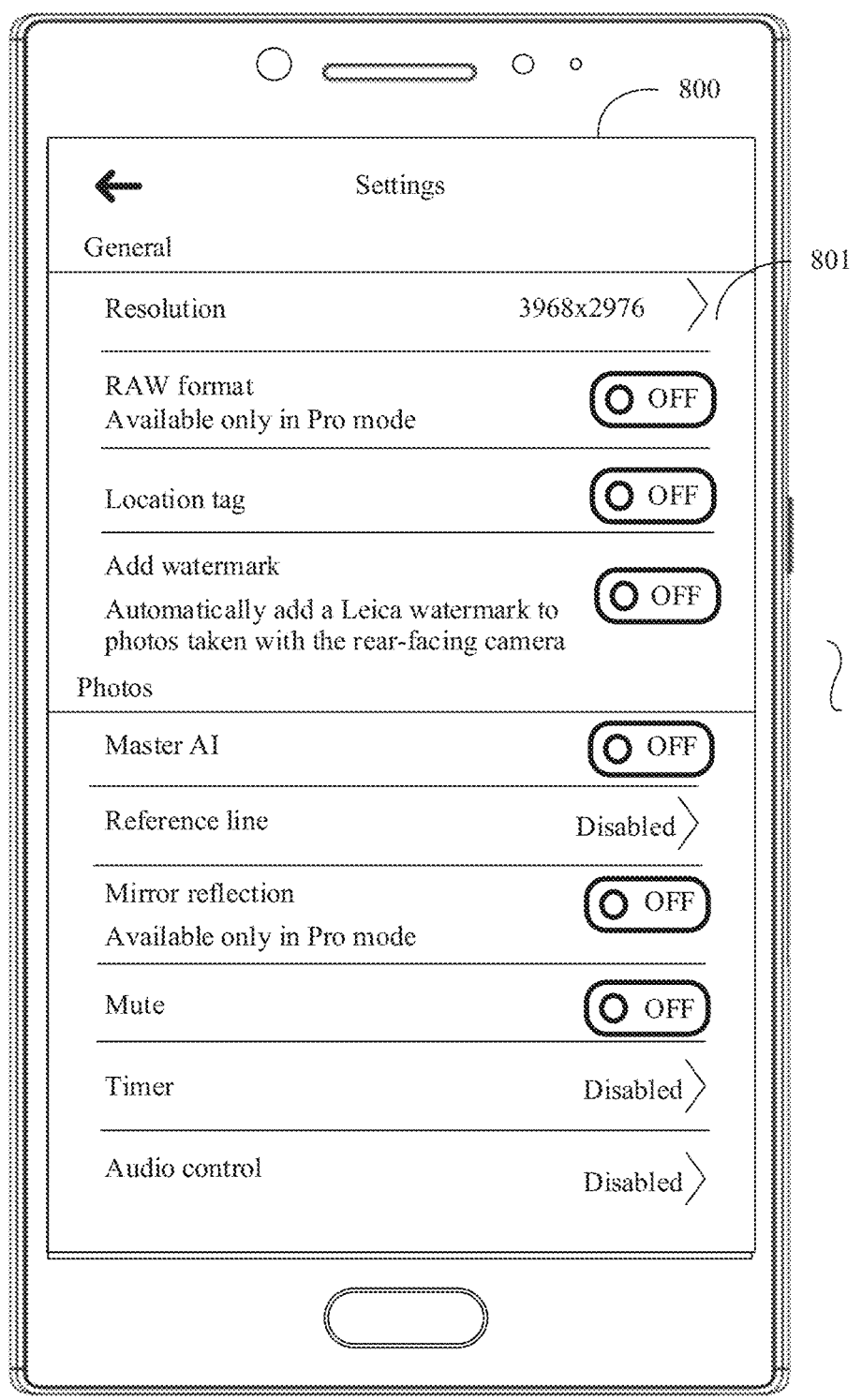
FIG. 8a and FIG. 8b are a schematic diagram of a user interface according to another embodiment of this application.
Figure 8B:
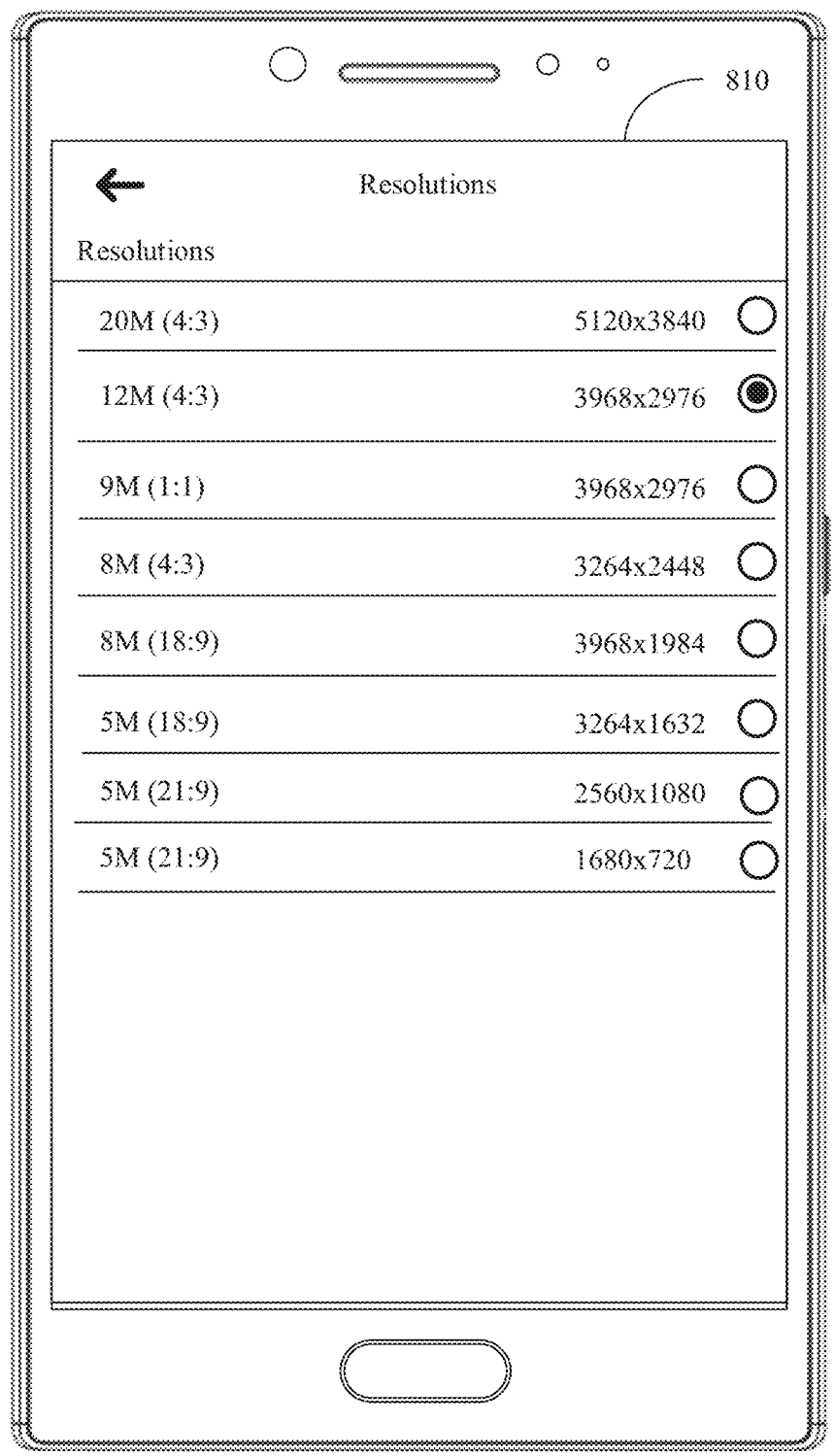

The first resolution may be represented by multiplying a quantity of pixels in a horizontal direction and a quantity of pixels in a vertical direction. For example, the first resolution is 5120×3840, to be specific, the quantity of pixels in the horizontal direction is 5120, and the quantity of pixels in the vertical direction is 3840. Specifically, the first resolution may be set by default, or may be set by the user. For example, the user may set the first resolution by using a shooting setting interface. For example, the shooting setting interface may be a user interface 800 shown in FIG. 8*a*. The user interface 800 includes a button 801 for resolution setting, and may further include other buttons such as "Location tag", "RAW format", and "Add watermark". The electronic device may display an image resolution setting interface on the display 151 in response to a touch operation performed by the user on the button 501. The image resolution setting interface includes a plurality of resolution options supported by the electronic device. For example, resolutions supported by the electronic device include 5120× 3840, 3968×2976, 2976×2976, 3264×2448, 3968×1984, 3264×1632, 2560×1080, and 1680×720. In this case, the image resolution setting interface may be a user interface 810 shown in FIG. 8*b*. The user may select one of the plurality of resolution options included in the user interface 510 according to a user requirement. For example, as shown in FIG. 8*a* and FIG. 8*b*, if the resolution option selected by the user is 3968×2976, the plurality of images that are captured by the camera 153 and that are obtained by the electronic device at the specific rate are 3968×2976 images, in other words, the first resolution is 3968×2976. In some embodiments, when displaying the preview interface, in response to a second operation performed by the user, the display 151 of the electronic device may display a shooting setting interface on the display 151. For example, the second operation may be a left swiping operation, a right swiping operation, or an operation performed on a setting button included in the preview interface. In addition, in this embodiment of this application, the display 151 may further display the shooting setting interface in another manner. This is not limited.

In some embodiments, the second resolution may be preset in the electronic device, and is a fixed and relatively small value and is less than the first resolution. For example, the second resolution may be set to 224×224. For example, when the first resolution is preset to 3968×2976, the electronic device performs down-sampling processing on a 3968×2976 image to obtain a 224×224 image. For another example, when the first resolution is preset to 2976×2976, the electronic device performs down-sampling processing on a 2976×2976 image to obtain a 224×224 image.

In some other embodiments, an algorithm for determining the second resolution is preset in the electronic device. For example, the electronic device determines the second resolution based on the first resolution. For example, when the first resolution is 5120×3840 or 3968×2976, the electronic device determines that the second resolution is 160×120. For another example, when the first resolution is 2976×2976, the electronic device determines that the second resolution is 224×224.

The foregoing is merely two specific implementations of presetting the second resolution. In this application, the second resolution may alternatively be preset in another manner. This is not limited.

Step 705: The electronic device performs scene recognition based on K images that meet an image quality screening condition in N images obtained through down-sampling, to determine a shooting scene, where K is a positive integer less than N. Specifically, a value of M may be preset in the electronic device according to an actual situation. For example, K may be a positive integer such as 2, 3, or 4.

Specifically, in step 705, each time the electronic device obtains an image through down-sampling, the electronic device may determine whether the image obtained through down-sampling meets the image quality screening condition. When the image obtained through down-sampling meets the image quality screening condition, the electronic device caches the image obtained through down-sampling; otherwise, discards the image obtained through down-sampling. When caching the K images, the electronic device may perform scene recognition to determine the shooting scene.

In other words, in this embodiment of this application, the electronic device may obtain, at the specific rate, an image captured by the camera 153, simultaneously perform down-sampling on the obtained image captured by the camera 153, and then determine whether an image obtained through down-sampling meets the image quality screening condition. When determining that there are K images that meet the image quality screening condition, the electronic device may further perform scene recognition. This helps improve image processing efficiency.

In addition, in some other embodiments of this application, after separately determining whether the N images obtained through down-sampling meet the image quality screening condition, the electronic device may further determine the K images from all images that meet the image quality screening condition in the N images obtained through down-sampling, to perform scene recognition and determine the shooting scene.

It should be noted that, for a specific implementation of the image quality screening condition and a specific implementation of performing scene recognition based on the K images in step 705, refer to the related implementations in step 404 in FIG. 4. Details are not described herein again.

Step 706: The electronic device determines, based on the shooting scene, M images from the N images that are captured by the camera 153 and that are obtained at the specific rate, where M is a positive integer greater than or equal to 1. For example, a value of M may be set according to a user requirement, or may be set in the electronic device before delivery. For example, M is 4 or 5. It should be noted that M is less than or equal to N.

Specifically, for a specific implementation in which the electronic device determines, based on the shooting scene, the M images from the N images that are captured by the camera 153 and that are obtained at the specific rate in step 706, refer to the related implementation in step 405. Details are not described herein again.

It should be noted that the M images determined in step 706 are M images obtained through down-sampling, the M images are M second-resolution images, and the M second-resolution images are originally M first-resolution images before down-sampling is performed.

In some other embodiments, after determining the M second-resolution images, the electronic device may further display the M second-resolution images on the display 151. For example, in response to an operation performed by the user on one of the M second-resolution images, the electronic device may display, on the display 151 in full screen, a first-resolution image corresponding to the second-resolution image. This helps the user view or preview the image. It should be noted that, for a specific implementation in which the user performs an operation on one of the M second-resolution images, refer to the manner in which the user performs an operation on one of the four images in the method for selecting an image based on burst shooting shown in FIG. 4. Details are not described herein again. In some embodiments, in response to the operation that the user performs an operation on one of the M second-resolution images, the electronic device may determine, based on an identifier of the second-resolution image, a first-resolution image corresponding to the identifier, and display, on the display 151 in full screen, the first-resolution image corresponding to the identifier. The identifier may be a frame number, a number, a character, or the like. This is not limited. For example, when obtaining a first-resolution image captured by the camera 153, the electronic device allocates an identifier to the first-resolution image. Images correspond to different identifiers. When the electronic device performs down-sampling on a first-resolution image corresponding to an identifier to obtain a second-resolution image, an identifier of the second-resolution image is the same as that of the first-resolution image obtained before down-sampling is performed. Therefore, after determining the M second-resolution images, the electronic device may determine, based on identifiers of the second-resolution images, first-resolution images corresponding to the second-resolution images.

In response to a touch operation performed by the user on the first-resolution image displayed in full screen, the electronic device may further return to a user interface of displaying the M second-resolution images from a user interface of displaying the first-resolution image in full screen, for ease of viewing by the user. This helps improve interaction between a user and a terminal.

In some other embodiments, when displaying the M second-resolution images on the display 151, the electronic device may store, in "Gallery" in response to the second operation, a first-resolution image corresponding to an image selected by the user from the M second-resolution images, and delete a first-resolution image corresponding to an unselected image. In some embodiments, the electronic device may further delete all second-resolution images. This helps increase utilization of storage space of the electronic device.

In addition, after determining the M second-resolution images in step 708, the electronic device may further find the first-resolution images respectively corresponding to the M second-resolution images, and automatically store the M first-resolution images in the gallery, for ease of viewing by the user. For example, the electronic device may respectively find, based on the identifiers of the M second-resolution images, the first-resolution images corresponding to the M second-resolution images.

The electronic device may delete an image other than the M first-resolution images. This helps increase utilization of storage space.

Figure 9:
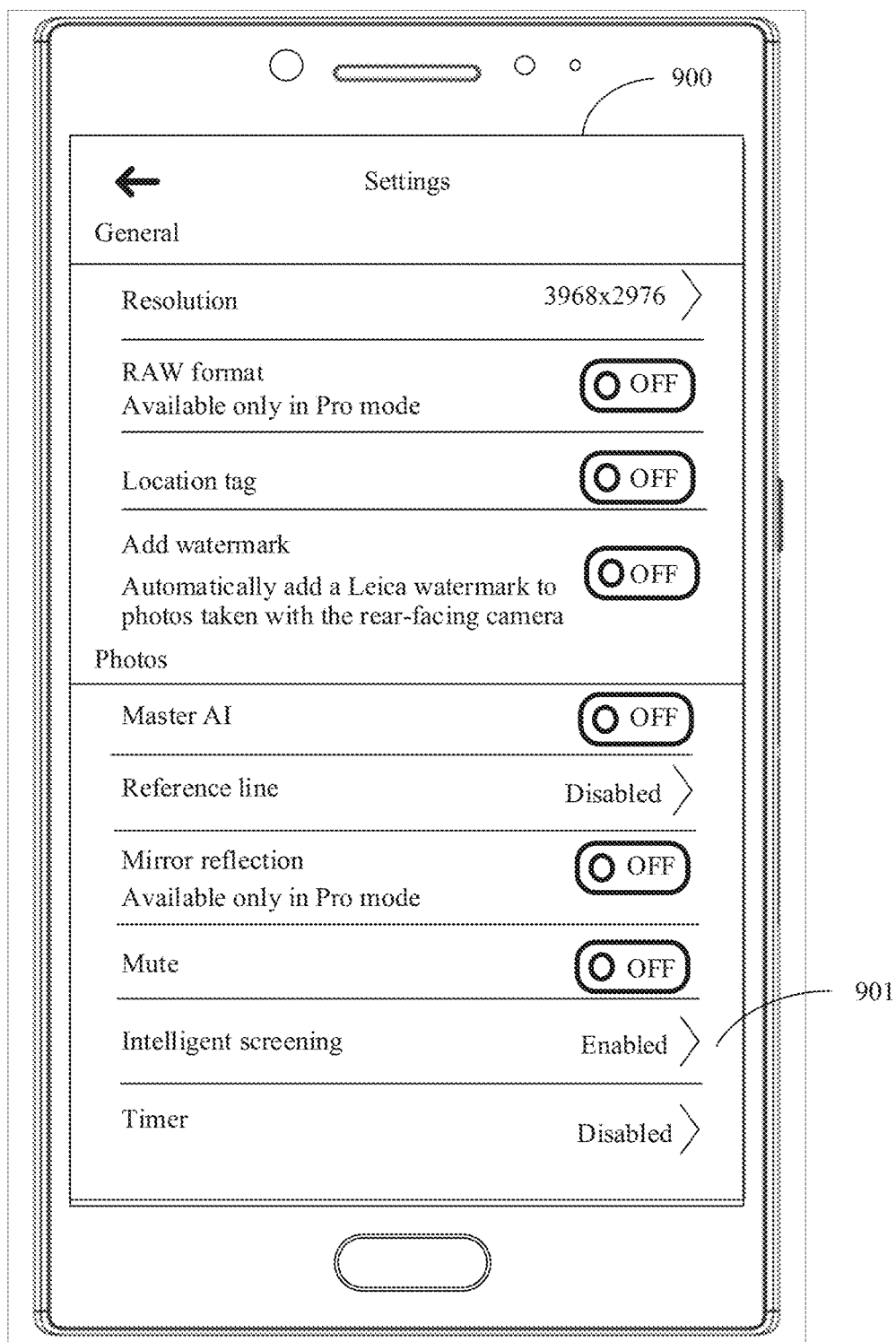
FIG. 9 is a schematic diagram of a user interface according to another embodiment of this application.

In some other embodiments of this application, when detecting that the user enables a function of performing intelligent image screening based on burst shooting, the electronic device may perform the method for selecting an image based on burst shooting in this embodiment of this application. This helps implement interaction with the user. For example, the electronic device may add, to the shooting setting interface, a button for controlling enabling or disabling of the function of performing intelligent image screening based on burst shooting, and the user may operate the button to enable or disable the function of performing intelligent image screening based on burst shooting. For example, the shooting setting interface may be a user interface 900 shown in FIG. 9. The user interface 900 includes a button 901. After the button 901 is enabled, when performing burst shooting, the electronic device may automatically perform the method for selecting an image based on burst shooting in this embodiment of this application. Alternatively, when a quantity of images that are captured by the camera 153 and that are obtained at the specific rate is greater than a threshold after burst shooting is enabled, the electronic device may automatically perform the method for selecting an image based on burst shooting in this embodiment of this application.

The foregoing embodiments may be used separately, or may be used in combination to achieve different technical effects.

In the embodiments provided in this application, the methods provided in the embodiments of this application are described from the perspective in which the electronic device is used as an execution body. To implement functions in the methods provided in the embodiments of this application, the electronic device may include a hardware structure and/or a software module, to implement the functions in a form of the hardware structure, the software module, or a combination of the hardware structure and the software module. Whether a specific function in the foregoing functions is performed by the hardware structure, the software module, or the combination of the hardware structure and the software module depends on particular applications and design constraints of the technical solutions.

Figure 10:
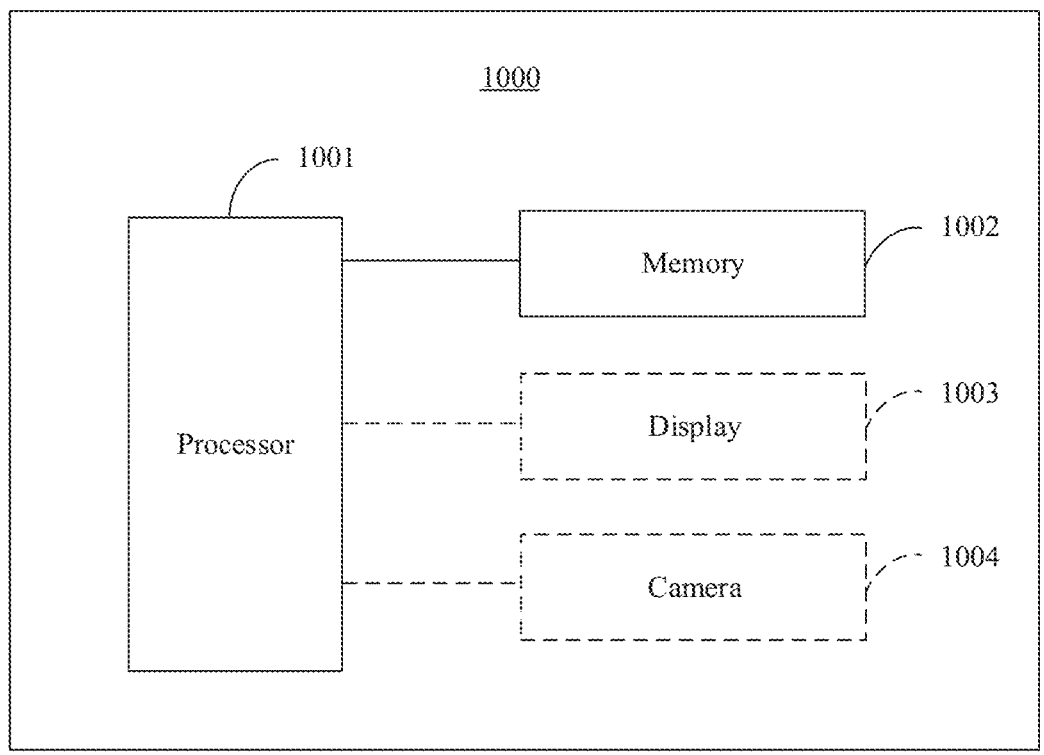
FIG. 10 is a schematic structural diagram of an electronic device according to another embodiment of this application.

As shown in FIG. 10, an embodiment of this application discloses an electronic device 1000. The electronic device 1000 may include one or more processors 1001 and a memory 1002. In some embodiments, the foregoing components may be connected through one or more communications buses. In addition, the foregoing components in this embodiment of this application may also be connected in another manner.

The memory 1002 stores one or more computer programs. The one or more computer programs include instructions. The processor 1001 invokes the instructions stored in the memory 1002, so that the electronic device 1000 is enabled to perform the method for selecting an image based on burst shooting shown in FIG. 4 or FIG. 7 in the embodiment of this application.

In this embodiment of this application, the processor 1001 may be a general-purpose processor, a digital signal processor, an application-specific integrated circuit, a field programmable gate array or another programmable logic device, a discrete gate or a transistor logic device, or a discrete hardware component, and may implement or perform the methods, the steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by a combination of hardware in the processor and a software module. The software module may be located in the memory 1002, and the processor 1001 reads program instructions in the memory 1002 and completes the steps in the foregoing methods in combination with hardware of the processor 1001.

In this embodiment of this application, the memory 1002 may be a nonvolatile memory, such as a hard disk drive (hard disk drive, HDD) or a solid-state drive (solid-state drive, SSD), or may be a volatile memory (volatile memory), such as a random access memory (random-access memory, RAM). The memory may alternatively be any other medium that can be configured to carry or store expected program code in a form of instructions or a data structure and that can be accessible by a computer. This is not limited thereto. The memory in this embodiment of this application may alternatively be a circuit or any other apparatus that can implement a storage function, and is configured to store instructions and/or data.

In some embodiments, the electronic device 1000 may display an image by using an externally connected display, and capture an image by using an externally connected camera.

In some other embodiments, the electronic device 1000 in this embodiment of this application further includes a display 1003 and a camera 1004. For example, the display 1003 is configured to display an image, and the camera 1004 is configured to capture an image.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located at one position, or may be distributed on a plurality of network units. Some or all of the units may be selected according to an actual requirement to achieve an objective of the solutions of the embodiments.

In addition, function units in the embodiments of this application may be integrated into one processing unit, or each of the units may exist alone physically, or two or more units are integrated into one unit.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "when it is determined that", or "in response to determining", or "when (a stated condition or event) is detected", or "in response to detecting (a stated condition or event)".

All or some of the foregoing embodiments may be implemented by software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, all or some of the procedures or the functions according to the embodiments of the present invention are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

A part of this patent application document includes the content protected by the copyright. The copyright owner reserves the copyright except for making a copy of the patent documents of the Patent Office or the contents of the recorded patent documents.

What is claimed is:

1. A method comprising:
    displaying, by an electronic device comprising a camera and a display, a preview interface on the display, wherein the preview interface displays an image captured by the camera;
    detecting, by the electronic device, a first operation of a user that indicates to start burst shooting using the camera;
    in response to detecting the first operation, obtaining, by the electronic device, N first-resolution images captured by the camera using burst shooting;
    performing down-sampling on the N first-resolution images to obtain N second-resolution images;
    performing, by the electronic device, scene recognition based on K images that meet an image quality screening condition in the N second-resolution images, to determine a shooting scene;
    determining, by the electronic device, M second-resolution images from the N second-resolution images based on an image content screening condition corresponding to the shooting scene, wherein N is greater than or equal to K, N is greater than or equal to M, N and K are positive integers greater than 1, and M is a positive integer greater than or equal to 1;
    displaying, by the electronic device, the M second-resolution images on the display; and
    in response to detecting a second operation performed by a user on a first image in the M second-resolution images, displaying, by the electronic device, a second image on the display in full screen, wherein the second image is a first-resolution image corresponding to the first image.

2. The method according to claim 1, wherein the determining, by the electronic device, M second-resolution images from the N second-resolution images based on an image content screening condition corresponding to the shooting scene comprises:
    determining, by the electronic device, the M second-resolution images that meet the image content screening condition from Q images, wherein the Q images are all images that meet the image quality screening condition in the N second-resolution images, M≤Q≤N, and Q is a positive integer.

3. The method according to claim 1, wherein after the displaying, by the electronic device, the M second-resolution images on the display, the method further comprises:

in response to detecting an operation that the user selects at least one image from the M second-resolution images, storing, by the electronic device, the at least one image.

4. The method according to claim 1, wherein the performing, by the electronic device, the scene recognition based on the K images that meet the image quality screening condition in the N second-resolution images, to determine the shooting scene comprises:

performing, by the electronic device, the scene recognition based on preset scene recognition priority information and the K images that meet the image quality screening condition in the N second-resolution images, to determine the shooting scene.

5. The method according to claim 4, wherein the preset scene recognition priority information indicates that a descending order of scene recognition priorities is: a jumping scene, a look-back scene, and another scene.

6. The method according to claim 1, wherein the performing, by the electronic device, the scene recognition based on the K images that meet the image quality screening condition in the N second-resolution images, to determine the shooting scene comprises:

each time the electronic device obtains an image captured by the camera in the burst shooting, determining, by the electronic device, whether the image captured by the camera meets the image quality screening condition; and when the image meets the image quality screening condition, caching, by the electronic device, the image; or when the image does not meet the image quality screening condition, deleting, by the electronic device, the image; and determining, by the electronic device, that there are K cached images that meet the image quality screening condition, and performing the scene recognition based on the K cached images that meet the image quality screening condition, to determine the shooting scene.

7. The method according to claim 1, wherein the image quality screening condition comprises one or more of an image definition screening condition, an image contrast screening condition, an image brightness screening condition, an image exposure screening condition, an image saturation screening condition, a condition indicating whether there is a color block in an image, or a condition indicating whether there is a color cast in an image.

8. An electronic device comprising:
a display;
a camera;
one or more processors; and
a non-transitory memory, wherein the memory stores one or more computer programs, the one or more computer programs comprise instructions, and when the instructions are executed by the electronic device, the electronic device is caused to perform:
displaying a preview interface on the display, wherein the preview interface displays an image captured by the camera;
detecting a first operation of a user that indicates to start burst shooting using the camera;
in response to detecting the first operation, obtaining N first-resolution images captured by the camera using burst shooting;
performing down-sampling on the N first-resolution images to obtain N second-resolution images;
performing scene recognition based on K images that meet an image quality screening condition in the N second-resolution images, to determine a shooting scene;
determining M second-resolution images from the N second-resolution images based on an image content screening condition corresponding to the shooting scene, wherein N is greater than or equal to K, N is greater than or equal to M, N and K are positive integers greater than 1, and M is a positive integer greater than or equal to 1;
displaying, by the electronic device, the M second-resolution images on the display; and
in response to detecting a second operation performed by a user on a first image in the M second-resolution images, displaying, by the electronic device, a second image on the display in full screen, wherein the second image is a first-resolution image corresponding to the first image.

9. The electronic device according to claim 8, wherein when the instructions are executed by the electronic device, the electronic device is caused to perform:

determining the M second-resolution images that meet the image content screening condition from Q images, wherein the Q images are all images that meet the image quality screening condition in the N second-resolution images, M≤Q≤N, and Q is a positive integer.

10. The electronic device according to claim 8, wherein when the instructions are executed by the electronic device, after determining the M images, the electronic device is caused to further perform:

automatically storing the M images, and deleting an image in the N second-resolution images other than the M images.

11. The electronic device according to claim 8, wherein when the instructions are executed by the electronic device, after displaying the first image on the display in full screen, the electronic device is caused to further perform:

in response to a third operation performed by the user on the first image, exiting full-screen display of the first image, and displaying the M second-resolution images on the display.

12. The electronic device according to claim 8, wherein when the instructions are executed by the electronic device, after displaying the first image on the display in full screen, the electronic device is caused to further perform:

in response to detecting an operation that the user selects at least one image from the M second-resolution images, storing the at least one image.

13. The electronic device according to claim 8, wherein the performing the scene recognition based on the K images that meet the image quality screening condition in the N second-resolution images, to determine the shooting scene comprises:

performing the scene recognition based on preset scene recognition priority information and the K images that meet the image quality screening condition in the N second-resolution images, to determine the shooting scene.

14. The electronic device according to claim 13, wherein the preset scene recognition priority information indicates that a descending order of scene recognition priorities is: a jumping scene, a look-back scene, and another scene.

15. The electronic device according to claim 8, wherein performing the scene recognition based on the K images that meet the image quality screening condition in the N second-resolution images, to determine the shooting scene comprises:

each time the electronic device obtains an image captured by the camera in the burst shooting, determining whether the image captured by the camera meets the image quality screening condition; and when the image meets the image quality screening condition, caching the image; or when the image does not meet the image quality screening condition, deleting the image; and determining that there are K cached images that meet the image quality screening condition, and performing the scene recognition based on the K cached images that meet the image quality screening condition, to determine the shooting scene.

16. The electronic device according to claim 8, wherein the image quality screening condition comprises one or more of an image definition screening condition, an image contrast screening condition, an image brightness screening condition, an image exposure screening condition, an image saturation screening condition, a condition indicating whether there is a color block in an image, or a condition indicating whether there is a color cast in an image.

* * * * *